US011025362B2

(12) United States Patent
Yin et al.

(10) Patent No.: US 11,025,362 B2
(45) Date of Patent: Jun. 1, 2021

(54) DYNAMIC TIME ADJUSTMENT METHOD, APPARATUS, AND SYSTEM

(71) Applicant: Huawei Technologies Co., Ltd., Shenzhen (CN)

(72) Inventors: Hui Yin, Shenzhen (CN); Xiang Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/805,417

(22) Filed: Feb. 28, 2020

(65) Prior Publication Data

US 2020/0204286 A1    Jun. 25, 2020

Related U.S. Application Data

(63) Continuation of application No. PCT/CN2018/076412, filed on Feb. 12, 2018.

(30) Foreign Application Priority Data

Aug. 30, 2017   (CN) .......................... 201710766484.4

(51) Int. Cl.
*H04J 14/08*   (2006.01)
*H04B 3/32*    (2006.01)
*H04L 5/14*    (2006.01)

(52) U.S. Cl.
CPC ............... *H04J 14/08* (2013.01); *H04B 3/32* (2013.01); *H04L 5/14* (2013.01)

(58) Field of Classification Search
CPC ............... H04J 14/08; H04B 3/32; H04L 5/14
See application file for complete search history.

(56) References Cited

U.S. PATENT DOCUMENTS 6,356,555 B1 * 3/2002 Rakib ................. H03M 13/256
370/441
2004/0208158 A1 * 10/2004 Fellman ............. H04L 12/6418
370/345

(Continued)

FOREIGN PATENT DOCUMENTS

CN          1452821 A    10/2003
CN          1825780 A    8/2006
(Continued)

OTHER PUBLICATIONS

Rapporteur, "G.fast: Updated draft text for G.9701 Amendment 5 (for consent)," XP044237859, Feb. 1, 2018, pp. 1-40.

(Continued)

*Primary Examiner* — Tanya T Motsinger
(74) *Attorney, Agent, or Firm* — Slater Matsil, LLP

(57) ABSTRACT

This application discloses a dynamic time adjustment method, apparatus, and system, and pertains to the field of network communications. The method includes: determining a length of a new downstream transmission duration; updating lengths of upstream and downstream transmission durations based on the determined length of the new downstream transmission duration; and keeping silent or sending an idle symbol or another symbol with known content in a transition zone until all user-side devices complete updating of the lengths of the upstream and downstream transmission durations, where the transition zone is an additional zone of the new downstream transmission duration compared with a currently used downstream transmission duration, or an additional zone of a new upstream transmission duration compared with a currently used upstream transmission duration.

20 Claims, 16 Drawing Sheets

(56) References Cited

U.S. PATENT DOCUMENTS

| | | | |
|---|---|---|---|
| 2007/0281643 A1* | 12/2007 | Kawai | H04W 56/0045 |
| | | | 455/185.1 |
| 2008/0279125 A1 | 11/2008 | Hottinen | |
| 2009/0201838 A1 | 8/2009 | Zhang et al. | |
| 2012/0063425 A1 | 3/2012 | Wang et al. | |
| 2014/0334353 A1 | 11/2014 | Wei | |
| 2016/0191230 A1 | 6/2016 | Shi et al. | |
| 2019/0173658 A1* | 6/2019 | Fehrenbach | H04W 72/0446 |
| 2020/0084080 A1* | 3/2020 | Cooper | H04L 27/2656 |
| 2020/0119873 A1* | 4/2020 | Wang | H04L 5/0096 |
| 2020/0186607 A1* | 6/2020 | Murphy | H04L 67/10 |
| 2020/0204286 A1* | 6/2020 | Yin | H04M 11/062 |
| 2020/0313840 A1* | 10/2020 | Den Besten | H04L 5/1469 |

FOREIGN PATENT DOCUMENTS

| | | |
|---|---|---|
| CN | 101014149 A | 8/2007 |
| CN | 101174967 A | 5/2008 |
| CN | 101262273 A | 9/2008 |
| CN | 101282168 A | 10/2008 |
| CN | 101483511 A | 7/2009 |
| CN | 101615927 A | 12/2009 |
| CN | 101754351 A | 6/2010 |
| CN | 102083187 A | 6/2011 |
| CN | 102137483 A | 7/2011 |
| CN | 102143594 A | 8/2011 |
| CN | 102711261 A | 10/2012 |
| CN | 104159305 A | 11/2014 |
| CN | 104350685 A | 2/2015 |
| CN | 106376075 A | 2/2017 |
| EP | 2192816 A1 | 6/2010 |
| WO | 2017125922 A1 | 7/2017 |

OTHER PUBLICATIONS

ITU, "Fast Access to Subscriber Terminals (FAST)-Physical layer specification," Series G: Transmission Systems and Media, Digital Systems and Networks; Access networks-Metallic access networks, ITU-T G.9701 (Dec. 2014), 340 pages.

* cited by examiner

DYNAMIC TIME ADJUSTMENT METHOD, APPARATUS, AND SYSTEM

CROSS-REFERENCE TO RELATED APPLICATIONS

This application is a continuation of International Application No. PCT/CN2018/076412, filed on Feb. 12, 2018, which claims priority to Chinese Patent Application No. 201710766484.4, filed on Aug. 30, 2017. The disclosures of the aforementioned applications are hereby incorporated by reference in their entireties.

TECHNICAL FIELD

This application relates to the field of network communications, and in particular, to a dynamic time adjustment method, apparatus, and system.

BACKGROUND

Fiber to the distribution point (FTTdp) is a network communication solution using hybrid optical fibers/copper wires. In an FTTdp access scenario, an operator network is connected to a distribution point (dp) through an optical fiber. At the distribution point, an optical fiber and a twisted pair cable are converted by using FTTdp central office (CO) equipment, and the FTrdp CO equipment is connected to FTrdp customer premise equipment (CPE) by using the twisted pair cable as a transmission medium.

A digital subscriber line (DSL) technology is used as a data transmission manner between conventional FTrdp CO equipment and the FTTdp CPE. However, with development of a copper broadband access technology, the data transmission manner between the FTTdp CO equipment and the FTrdp CPE has been upgraded to a next-generation broadband access technology G.fast. The G.fast technology uses a time division duplex (TDD) manner, to be specific, some symbols in a TDD frame are used as downstream symbols to perform downstream data transmission, and the other symbols are used as upstream symbols to perform upstream data transmission.

For the TDD manner, a dynamic time assignment (DTA) mechanism can allocate an appropriate length of an upstream and downstream transmission duration (used for upstream and downstream data transmission) based on changed upstream and downstream traffic. Specifically, after determining a length of a new upstream and downstream transmission duration, the FTTdp CO equipment notifies the FTTdp CPE of the length by using a message. When one or some FTTdp CPEs do not receive the message or are temporarily incapable of adjusting the length of the upstream and downstream transmission duration according to the message, a length configuration of an upstream and downstream transmission duration cannot be implemented for a plurality of signals simultaneously accessed by the FTTdp CO equipment in a same TDD frame. As a result, upstream and downstream times of the different signals are asynchronous, and a near-end crosstalk occurs.

To resolve the near-end crosstalk existing in the plurality of signals during dynamic time adjustment, for FTTdp CPE that does not receive the message or is temporarily incapable of adjusting the length of the upstream and downstream transmission duration according to the message, a transceiver of the FTTdp CPE may still be in a sending state in an original upstream transmission duration, but does not send any signal to avoid the near-end crosstalk.

During a process of implementing this application, a current technology has the following disadvantages.

Because the transceiver of the FTTdp CPE has different equivalent impedances in a sending state and in a receiving state, far-end crosstalk channels are also different. Therefore, when the transceiver of the FTTdp CPE is in the sending state and a transceiver of the FTTdp CO equipment is also in the sending state, performance of the transceiver of the FTTdp CO equipment using a vectoring technology to cancel far-end crosstalk of the transceiver of the FTTdp CPE in the receiving state is degraded. Alternatively, when both the transceiver of the FTTdp CPE and that of the FTTdp CO equipment are in the receiving state, performance of the transceiver of the FTTdp CO equipment using a vectoring technology to cancel far-end crosstalk of the transceiver of the FTTdp CPE in the sending state is degraded. As a result, the far-end crosstalk cannot be canceled, a line rate is low, and line performance is unstable.

SUMMARY

To resolve degraded performance of a transceiver of FTTdp CO equipment using a vectoring technology to cancel far-end crosstalk of a transceiver of FTTdp CPE, embodiments of the present invention provide a dynamic time adjustment method, apparatus, and system. The technical solutions are as follows.

According to a first aspect, a dynamic time adjustment method is provided, where the method is executed by a network-side device, the network-side device includes at least two transceivers, and the dynamic time adjustment method includes: obtaining, by the network-side device, a length Mds_New of a new downstream transmission duration; adjusting, by the network-side device, a length of a downstream transmission duration of a first transceiver from a length Mds_Old of a currently used downstream transmission duration to Mds_New, and adjusting a length of an upstream transmission duration of the first transceiver from a length Mus_Old of a currently used upstream transmission duration to a length Mus_New of a new upstream transmission duration, where the first transceiver is any one of the at least two transceivers of the network-side device, a sum of Mds_New and Mus_New is equal to a length of one transmission frame minus a length of an upstream and downstream switching duration, and the upstream and downstream switching duration is a duration spent by the first transceiver to switch from a receiving state to a sending state and switch from the sending state to the receiving state; and when Mds_New is greater than Mds_Old, keeping, by the network-side device, silent or sending an idle symbol or another symbol with known content in a transition zone of the new downstream transmission duration of the first transceiver, where the transition zone of the new downstream transmission duration of the first transceiver is an additional zone of the new downstream transmission duration compared with the currently used downstream transmission duration (in other words, a zone, of the new downstream transmission duration, that is more than the currently used downstream transmission duration); or when Mds_New is less than Mds_Old, receiving, by the network-side device, a quiet symbol, an idle symbol, or another symbol with known content in a transition zone of the new upstream transmission duration of the first transceiver, where the transition zone of the new upstream transmission duration of the first transceiver is an additional zone of the new upstream transmission duration compared with the currently used upstream transmission duration (in other words, a zone, of the new upstream transmission duration, that is more than the currently used upstream transmission duration).

In this method, after obtaining the length of the new downstream transmission duration, the network-side device adjusts the lengths of the upstream and downstream transmission durations based on length of the new downstream transmission duration. After adjusting the lengths of the upstream and downstream transmission durations, the network-side device keeps silent, or transmits an idle symbol or another symbol with known content in the transition zone instead of directly transmitting a data transmission phase symbol in all zones, so as to avoid a low line rate and unstable performance caused by degraded performance of the network-side device using a vectoring technology to cancel far-end crosstalk. In one case, the network-side device keeps silent, or sends an idle symbol or another symbol with known content in the transition zone. In this case, the transition zone is an additional zone of the new downstream transmission duration compared with a currently used downstream transmission duration. In another case, the network-side device receives a quiet symbol, an idle symbol, or another symbol with known content in the transition zone. In this case, the transition zone is an additional zone of the new upstream transmission duration compared with the currently used upstream transmission duration.

A length of an upstream transmission duration of a transceiver is a length of time for the transceiver to perform upstream data transmission in a time division multiplexing frame. A length of a downstream transmission duration of the transceiver is a length of time for the transceiver to perform downstream data transmission in a time division multiplexing frame.

The data transmission phase symbol is any symbol sent by the network-side device during data transmission. The data transmission phase symbol includes but is not limited to a symbol carrying to-be-transmitted data, a quiet symbol, an idle symbol, and the like.

With reference to the first aspect, in a first implementation of the first aspect, the dynamic time adjustment method further includes: after obtaining Mds_New, sending, by the network-side device, a first indication message to a user-side device, where the first indication message is used to indicate Mds_New.

In this implementation, the network-side device sends the first indication message to the user-side device, to notify the user-side device of the adjusted length Mds_New of the downstream transmission durations, so that the user-side device may perform adjustment based on the length.

With reference to the first implementation of the first aspect, in a second implementation of the first aspect, the sending, by the network-side device, a first indication message to a user-side device includes: sending, by the network-side device, the first indication message in a downstream robust management channel (RMC) symbol, or sending the first indication message on an embedded operations channel (EOC).

In this implementation, the first indication message is sent in an RMC symbol or on an embedded operations channel (EOC). This manner of sending the first indication message is simple and convenient.

With reference to the first implementation of the first aspect, in a third implementation of the first aspect, the method further includes: when Mds_New is less than Mds_Old, lengths of downstream transmission durations of transceivers of at least two user-side devices are adjusted to Mds_New, and lengths of upstream transmission durations of the transceivers of the at least two user-side devices are adjusted to Mus_New, sending, by the network-side device, a second indication message to the user-side devices, where the second indication message is used to instruct the user-side devices to send a data transmission phase symbol in the transition zone of the new upstream transmission duration, and the transceivers of the at least two user-side devices are disposed corresponding to the at least two transceivers of the network-side device.

In this implementation, the network-side device sends the second indication message to the user-side devices, to instruct the user-side devices to send the data transmission phase symbol in the transition zone of the new upstream transmission duration, so as to implement normal data transmission.

With reference to the third implementation of the first aspect, in a fourth implementation of the first aspect, the second instruction message is further used to instruct the user-side devices to adjust positions of upstream RMC symbols corresponding to the transceivers of the user-side devices.

In this implementation, in addition to instructing the user-side devices to send the data transmission phase symbol in the transition zone of the new upstream transmission duration, the second indication message may instruct the user-side devices to adjust the positions of the upstream RMC symbols corresponding to the transceivers of the user-side devices. In the implementation of this embodiment of the present invention, the user-side devices may or may not adjust the positions of the RMC symbols.

With reference to the third implementation of the first aspect, in a fifth implementation of the first aspect, the first indication message is further used to: when Mds_New is less than Mds_Old, before the user-side device receives the second indication message, and when a current transmission frame is a synchronization frame, instruct the user-side device to send a synchronization symbol in a first symbol in the transition zone of the new upstream transmission duration, or the first indication message is further used to: when Mds_New is less than Mds_Old, before the user-side device receives the second indication message, and when a current transmission frame is a synchronization frame, instruct the user-side device to send a synchronization symbol in a first symbol after the transition zone of the new upstream transmission duration.

In this implementation, in addition to notifying the adjusted lengths of the upstream and downstream transmission durations, the first indication message may instruct the user-side device to send the synchronization symbol in the first symbol of the new upstream transmission duration, or send the synchronization symbol in a first symbol of the currently used upstream transmission duration.

With reference to the first aspect, in a sixth implementation of the first aspect, the method further includes: when Mds_New is greater than Mds_Old, lengths of downstream transmission durations of transceivers of at least two user-side devices are adjusted to the length of the new downstream transmission duration, and lengths of upstream transmission durations of the transceivers of the at least two user-side devices are adjusted to the length of the new upstream transmission duration, sending, by the network-side device, a data transmission phase symbol in the transition zone of the new downstream transmission duration, where the transceivers of the at least two user-side devices are disposed corresponding to the at least two transceivers of the network-side device.

In this implementation, after detecting that the lengths of the upstream and downstream transmission durations are adjusted for the at least two user-side devices, the network-side device sends the data transmission phase symbol in the transition zone of the new downstream transmission duration.

With reference to any one of the third to sixth implementations of the first aspect, in a seventh implementation of the first aspect, the method further includes: determining, by the network-side device, whether the lengths of the downstream transmission durations of the transceivers of the at least two user-side devices are adjusted to Mds_New, and whether the lengths of the upstream transmission durations of the transceivers of the at least two user-side devices are adjusted to Mus_New.

After detecting that the lengths of the upstream and downstream transmission durations are adjusted for the at least two user-side devices, the network-side device sends the data transmission phase symbol in the transition zone of the new downstream transmission duration. Therefore, the network-side device needs to first determine whether the lengths of the downstream transmission durations of the transceivers of the at least two user-side devices are adjusted to the length of the new downstream transmission duration.

With reference to the seventh implementation of the first aspect, in an eighth implementation of the first aspect, the determining, by the network-side device, whether the lengths of the downstream transmission durations of the transceivers of the at least two user-side devices are adjusted to Mds_New, and whether the lengths of the upstream transmission durations of the transceivers of the at least two user-side devices are adjusted to Mus_New includes: receiving, by the network-side device, acknowledgment messages sent by the transceivers of the at least two user-side device, where the acknowledgment messages are used to indicate that the lengths of the downstream transmission durations of the transceivers of the user-side devices have been adjusted to Mds_New, and the lengths of the upstream transmission durations of the transceivers of the user-side devices have been adjusted to Mus_New; and determining, by the network-side device based on the acknowledgment messages, whether the lengths of the downstream transmission durations of the transceivers of the at least two user-side devices are adjusted to Mds_New, and whether the lengths of the upstream transmission durations of the transceivers of the at least two user-side devices are adjusted to Mus_New.

In this implementation, the network-side device determines, by receiving the acknowledgment message sent by the transceiver of the user-side device, whether the length of the upstream transmission duration of the transceiver of the user-side device is adjusted to the length of the new upstream transmission duration.

With reference to the seventh implementation of the first aspect, in a ninth implementation of the first aspect, the determining, by the network-side device, whether the lengths of the downstream transmission durations of the transceivers of the at least two user-side devices are adjusted to Mds_New, and whether the lengths of the upstream transmission durations of the transceivers of the at least two user-side devices are adjusted to Mus_New includes: detecting, by the network-side device frame by frame, positions of upstream RMC symbols corresponding to the transceivers of the at least two user-side devices; when it is detected that the position of the upstream RMC symbol corresponding to a transceiver of a first user-side device is following a first position by a quantity of symbols to be increased in the new downstream transmission duration, determining that the length of the downstream transmission duration corresponding to the transceiver of the first user-side device has been adjusted to Mds_New, and the length of the upstream transmission duration has been adjusted to Mus_New, where the first position is a position of the upstream RMC symbol before the length of the upstream transmission duration is adjusted to a time of Mus_New, and the at least two user-side devices include the first user-side device; and determining, by the network-side device based on the detected positions of the upstream RMC symbols corresponding to the transceivers of the at least two user-side devices, whether the lengths of the downstream transmission durations of the transceivers of the at least two user-side devices are adjusted to Mds_New, and whether the lengths of the upstream transmission durations of the transceivers of the at least two user-side devices are adjusted to Mus_New.

In this implementation, the network-side device determines, by determining the positions of the upstream RMC symbols, whether the lengths of the upstream transmission durations of the transceivers of the user-side devices are adjusted to the length of the new upstream transmission duration.

With reference to any one of the first aspect, or the first to sixth implementations of the first aspect, in a tenth implementation of the first aspect, the method further includes: when receiving an online request sent by the user-side device, sending, by the network-side device, a default length and a first identifier of the downstream transmission duration to the user-side device during handshake, where the first identifier is used to indicate a value of a difference between Mds_Old and the default length of the downstream transmission duration.

In this implementation, the network-side device sends the default length and the first identifier of the downstream transmission duration to the user-side device during handshake, to avoid a problem that a line during data transmission needs to be updated twice when the line goes online. For details, refer to detailed description of the embodiments.

With reference to any one of the first aspect, or the first to sixth implementations of the first aspect, in an eleventh implementation of the first aspect, the method further includes: when receiving a fast retraining request sent by the user-side device, sending, by the network-side device, a length and a second identifier of the downstream transmission duration during previous initialization to the corresponding user-side device, where the second identifier is used to indicate a value of a difference between Mds_Old and the length of the downstream transmission duration during the previous initialization of the user-side device.

In this implementation, the network-side device sends the length and the second identifier of the downstream transmission duration during previous initialization to the corresponding user-side device, to avoid near-end crosstalk generated between lines during fast retraining. For details, refer to detailed description of the embodiments.

With reference to any one of the first aspect, or the first to the sixth implementations of the first aspect, in a twelfth implementation of the first aspect, the obtaining, by the network-side device, a length Mds_New of a new downstream transmission duration includes: receiving, by the network-side device, a configuration parameter sent in a transmission opportunity primitive, where the configuration parameter includes Mds_New, TTRds, and TAds, or the configuration parameter includes Mus_New, TTRds, and TAds, where TTRds and TAds are used to indicate a zone in which the network-side device keeps silent in the new downstream transmission duration, and the zone in which the network-side device keeps silent in the new downstream transmission duration includes the transition zone of the new downstream transmission duration; or the configuration parameter includes Mds_New, TTRus, and TAus, or the configuration parameter includes Mus_New, TTRus, and TAus, where TTRus and TAus are used to indicate a zone in which the user-side device keeps silent in the new upstream transmission duration, and the zone in which the user-side device keeps silent in the new upstream transmission duration includes the transition zone of the new upstream transmission duration.

In this implementation, the network-side device obtains Mds_New from the transmission opportunity primitive to adjust the lengths of the upstream and downstream transmission durations, and keeps silent in the transition zone by configuring TTR and TA in the transmission opportunity primitive.

According to a second aspect, a dynamic time adjustment method is provided, where the method is executed by a network-side device, the network-side device includes at least two transceivers, and the dynamic time adjustment method includes: obtaining, by the network-side device, a length Mus_New of a new upstream transmission duration; adjusting, by the network-side device, a length of a downstream transmission duration of a first transceiver from a length Mds_Old of a currently used downstream transmission duration to a length Mds_New of a new downstream transmission duration, and adjusting a length of an upstream transmission duration of the first transceiver from a length Mus_Old of a currently used upstream transmission duration to Mus_New, where the first transceiver is any one of the at least two transceivers of the network-side device, a sum of Mds_New and Mus_New is equal to a length of one transmission frame minus a length of an upstream and downstream switching duration, and the upstream and downstream switching duration is a duration spent by the first transceiver to switch from a receiving state to a sending state and switch from the sending state to the receiving state; and when Mds_New is greater than Mds_Old, keeping, by the network-side device, silent or sending an idle symbol or another symbol with known content in a transition zone of the new downstream transmission duration of the first transceiver, where the transition zone of the new downstream transmission duration of the first transceiver is an additional zone of the new downstream transmission duration compared with the currently used downstream transmission duration (in other words, a zone, of the new downstream transmission duration, that is more than the currently used downstream transmission duration); or when Mds_New is less than Mds_Old, receiving, by the network-side device, a quiet symbol, an idle symbol, or another symbol with known content in a transition zone of the new upstream transmission duration of the first transceiver, where the transition zone of the new upstream transmission duration of the first transceiver is an additional zone of the new upstream transmission duration compared with the currently used upstream transmission duration (in other words, a zone, of the new upstream transmission duration, that is more than the currently used upstream transmission duration).

A difference between the second aspect and the first aspect is that the network-side device obtains the length of the new upstream transmission duration. The sum of the length of the upstream transmission duration and the length of the downstream transmission duration is equal to a total length of one transmission frame minus the upstream and downstream switching duration. Therefore, the length of the new downstream transmission duration may be determined based on the length of the new upstream transmission duration.

According to a third aspect, a dynamic time adjustment method is provided, where the dynamic time adjustment method includes: obtaining, by a user-side device, a length Mds_New of a new downstream transmission duration; adjusting, by the user-side device, a length of a downstream transmission duration of a transceiver of the user-side device from a length Mds_Old of a currently used downstream transmission duration to Mds_New, and adjusting a length of an upstream transmission duration of the transceiver of the user-side device from a length Mus_Old of a currently used upstream transmission duration to a length Mus_New of a new upstream transmission duration, where a sum of Mds_New and Mus_New is equal to a length of one transmission frame minus a length of an upstream and downstream switching duration, and the upstream and downstream switching duration is a duration spent by the transceiver of the user-side device to switch from a receiving state to a sending state and switch from the sending state to the receiving state; and when Mds_New is greater than Mds_Old, receiving, by the user-side device, a quiet symbol, an idle symbol, or another symbol with known content in a transition zone of the new downstream transmission duration of the transceiver of the user-side device, where the transition zone of the new downstream transmission duration of the transceiver of the user-side device is an additional zone of the new downstream transmission duration compared with the currently used downstream transmission duration (in other words, a zone, of the new downstream transmission duration, that is more than the currently used downstream transmission duration); or when Mds_New is less than Mds_Old, keeping, by the user-side device, silent or sending an idle symbol or another symbol with known content in a transition zone of the new upstream transmission duration of the transceiver of the user-side device, where the transition zone of the new upstream transmission duration of the transceiver of the user-side device is an additional zone of the new upstream transmission duration compared with the currently used upstream transmission duration (in other words, a zone, of the new upstream transmission duration, that is more than the currently used upstream transmission duration).

In this method, after obtaining the length of the new downstream transmission duration, the user-side device adjusts the lengths of the upstream and downstream transmission durations based on the length of the new downstream transmission duration (a network-side device adjusts lengths of upstream and downstream transmission durations at the same time). The user-side device keeps silent, or transmits an idle symbol or another symbol with known content in the transition zone instead of directly transmitting a data transmission phase symbol in all zones, so as to avoid degraded performance of the network-side device using a vectoring technology to cancel far-end crosstalk. In one case, the user-side device receives a quiet symbol, an idle symbol, or another symbol with known content in the transition zone. In this case, the transition zone is an additional zone of the new downstream transmission duration compared with the currently used downstream transmission duration. In another case, the user-side device keeps silent, or sends an idle symbol or another symbol with known content in the transition zone. In this case, the transition zone is an additional zone of the new upstream transmission duration compared with the currently used upstream transmission duration.

With reference to the third aspect, in a first implementation of the third aspect, the obtaining, by a user-side device, a length of a new downstream transmission duration includes: receiving, by the user-side device, a first indication message sent by the network-side device, where the first indication message is used to indicate Mds_New.

With reference to the third aspect or the first implementation of the third aspect, in a second implementation of the third aspect, the method further includes: when Mds_New is less than Mds_Old, receiving, by the user-side device, a second indication message sent by the network-side device, where the second indication message is used to instruct the user-side device to send the data transmission phase symbol in the transition zone of the new upstream transmission duration.

With reference to the second implementation of the third aspect, in a third implementation of the third aspect, the method further includes: determining, by the user-side device according to the second indication message, to adjust a position of an upstream RMC symbol corresponding to the transceiver of the user-side device, where the second indication message is further used to instruct the user-side device to adjust the position of the upstream RMC symbol corresponding to the transceiver of the user-side device.

With reference to the second implementation of the third aspect, in a fourth implementation of the third aspect, the method further includes: before the user-side device receives the second indication message and when a current transmission frame is a synchronization frame, determining, by the user-side device according to the first indication message, a position for sending a synchronization symbol, where the first indication message is further used to: when Mds_New is less than Mds_Old, before the user-side device receives the second indication message, and when the current transmission frame is a synchronization frame, instruct to send the synchronization symbol in a first symbol in the transition zone of the new upstream transmission duration, or the first indication message is further used to: when Mds_New is less than Mds_Old, before the user-side device receives the second indication message, and when the current transmission frame is a synchronization frame, instruct to send the synchronization symbol in a first symbol after the transition zone of the new upstream transmission duration.

With reference to the third aspect or the first implementation of the third aspect, in a fifth implementation of the third aspect, the dynamic time adjustment method further includes: sending, by the user-side device, an acknowledgment message to the network-side device, where the acknowledgment message is used to indicate that the length of the downstream transmission duration of the transceiver of the user-side device has been adjusted to Mds_New, and the length of the upstream transmission duration of the transceiver of the user-side device has been adjusted to Mus_New.

With reference to the third aspect or the first implementation of the third aspect, in a sixth implementation of the third aspect, the dynamic time adjustment method further includes: when the user-side device does not obtain Mds_New or is temporarily incapable of adjusting the length of the downstream transmission duration of the transceiver of the user-side device to Mds_New, keeping, by the user-side device, silent, or sending an idle symbol or another symbol with known content in the upstream transmission duration currently used by the transceiver of the user-side device, or sending, by the user-side device, the data transmission phase symbol in the upstream transmission duration currently used by the transceiver of the user-side device.

With reference to the third aspect or the first implementation of the third aspect, in a seventh implementation of the third aspect, the dynamic time adjustment method further includes: receiving, by the user-side device, a default length and a first identifier of the downstream transmission duration that are sent by the network-side device, and calculating Mds_Old based on the default length and the first identifier of the downstream transmission duration, where the first identifier is used to indicate a value of a difference between Mds_Old and the default length of the downstream transmission duration; and setting, by the user-side device, a length of the downstream transmission duration and a length of the upstream transmission duration based on Mds_Old during initialization.

With reference to the third aspect or the first implementation of the third aspect, in an eighth implementation of the third aspect, the dynamic time adjustment method further includes: receiving, by the user-side device, a length and a second identifier of the downstream transmission duration during previous initialization that are sent by the network-side device, and calculating Mds_Old based on the length and the second identifier of the downstream transmission duration during the previous initialization, where the second identifier is used to indicate a value of a difference between Mds_Old and the length of the downstream transmission duration during the previous initialization of the user-side device; and setting, by the user-side device, a length of the downstream transmission duration and a length of the upstream transmission duration based on Mds_Old during initialization.

According to a fourth aspect, a dynamic time adjustment method is provided, where the dynamic time adjustment method includes: obtaining, by a user-side device, a length Mus_New of a new upstream transmission duration; adjusting, by the user-side device, a length of a downstream transmission duration of a transceiver of the user-side device from a length Mds_Old of a currently used downstream transmission duration to a length Mds_New of a new downstream transmission duration, and adjusting a length of an upstream transmission duration of the transceiver of the user-side device from a length Mus_Old of a currently used upstream transmission duration to Mus_New, where a sum of Mds_New and Mus_New is equal to a length of one transmission frame minus a length of an upstream and downstream switching duration, and the upstream and downstream switching duration is a duration spent by the transceiver of the user-side device to switch from a receiving state to a sending state and switch from the sending state to the receiving state; and when Mds_New is greater than Mds_Old, receiving, by the user-side device, a quiet symbol, an idle symbol, or another symbol with known content in a transition zone of the new downstream transmission duration of the transceiver of the user-side device, where the transition zone of the new downstream transmission duration of the transceiver of the user-side device is an additional zone of the new downstream transmission duration compared with the currently used downstream transmission duration (in other words, a zone, of the new downstream transmission duration, that is more than the currently used downstream transmission duration); or when Mds_New is less than Mds_Old, keeping, by the user-side device, silent or sending an idle symbol or another symbol with known content in a transition zone of the new upstream transmission duration of the transceiver of the user-side device, where the transition zone of the new upstream transmission duration of the transceiver of the user-side device is an additional zone of the new upstream transmission duration compared with the currently used upstream transmission duration (in other words, a zone, of the new upstream transmission duration, that is more than the currently used upstream transmission duration).

A difference between the fourth aspect and the third aspect is that the user-side device obtains the length of the new upstream transmission duration. The sum of the length of the upstream transmission duration and the length of the downstream transmission duration is equal to a total length of one transmission frame minus the upstream and downstream switching duration. Therefore, the length of the new downstream transmission duration may be determined based on the length of the new upstream transmission duration.

According to a fifth aspect, an embodiment of the present invention provides a dynamic time adjustment apparatus, where the dynamic time adjustment apparatus includes units configured to implement the method according to any one of possible implementations in the first aspect or the second aspect, for example, an obtaining unit, an adjustment unit, and a transceiver unit.

According to a sixth aspect, an embodiment of the present invention provides a dynamic time adjustment apparatus, where the dynamic time adjustment apparatus includes units configured to implement the method according to any one of possible implementations in the third aspect or the fourth aspect, for example, an obtaining unit, an adjustment unit, and a transceiver unit.

According to a seventh aspect, an embodiment of the present invention provides a dynamic time adjustment apparatus, where the apparatus includes: a memory and a processor connected to the memory, where the memory is configured to store a software program and a module, and when the processor is configured to run or execute the software program and the module that are stored in the memory, the method according to any one of possible implementations in the first aspect or the second aspect is executed.

According to an eighth aspect, an embodiment of the present invention provides a dynamic time adjustment apparatus, where the apparatus includes: a memory and a processor connected to the memory, where the memory is configured to store a software program and a module, and when the processor is configured to run or execute the software program and the module that are stored in the memory, the method according to any one of possible implementations in the third aspect or the fourth aspect is executed.

According to a ninth aspect, an embodiment of the present invention further provides a computer readable medium, configured to store program code executed by a dynamic time adjustment apparatus, where the program code includes an instruction used to execute the method according to any one of possible implementations in the first aspect or the second aspect.

According to a tenth aspect, an embodiment of the present invention further provides a computer readable medium, configured to store program code executed by a dynamic time adjustment apparatus, where the program code includes an instruction used to execute the method according to any one of possible implementations in the third aspect or the fourth aspect.

According to an eleventh aspect, an embodiment of the present invention further provides a communications chip, applied to a dynamic time adjustment apparatus, where the communications chip includes: a processor, a memory, and a communications interface, where the processor, the memory, and the communications interface are coupled by using a bus, the memory is configured to store a program instruction, and the processor enables, by executing the program instruction stored in the memory, a communications system device loaded with the communications chip to execute the method according to any one of possible implementations in the first aspect or the second aspect.

According to a twelfth aspect, an embodiment of the present invention further provides a communications chip, applied to a dynamic time adjustment apparatus, where the communications chip includes: a processor, a memory, and a communications interface, where the processor, the memory, and the communications interface are coupled by using a bus, the memory is configured to store a program instruction, and the processor enables, by executing the program instruction stored in the memory, a communications system device loaded with the communications chip to execute the method according to any one of possible implementations in the third aspect or the fourth aspect.

According to a thirteenth aspect, an embodiment of the present invention further provides a dynamic time adjustment system, where the dynamic time adjustment system includes a network-side device and a user-side device, the network-side device includes the dynamic time adjustment apparatus according to any one of possible implementations in the fifth aspect, and the user-side device includes the dynamic time adjustment apparatus according to any one of possible implementations in the sixth aspect.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

A "module" mentioned in this specification is a program or an instruction that is stored in a memory and that can implement some functions. A "unit" mentioned in this specification is a functional structure obtained through division based on logic. The "unit" may be implemented by hardware only or by a combination of software and hardware.

Figure 1A:
FIG. 1A is a diagram of an application scenario according to an embodiment of the present invention.

For ease of description, the following first describes an application scenario of the embodiments of the present invention with reference to FIG. 1A.

As shown in FIG. 1A, in an FTTdp access scenario, an optical line terminal (OLT) 101 is connected to FTTdp CO equipment 102 at a distribution point by using a passive optical network (PON). The FTTdp CO equipment 102 converts an optical fiber and a twisted pair cable, and is connected to FTTdp CPE 103 by using the twisted pair cable.

The FTTdp CO equipment and the FTTdp CPE transmit signals by using technologies such as G.fast and very-high-speed digital subscriber line 2 (VDSL2). The following description uses G.fast as an example. When the G.fast technology is used, a plurality of signals are simultaneously accessed by the FTTdp CO equipment. Each signal corresponds to one G.fast transceiver unit at the CO (FTU-O) and one G.fast transceiver unit at the remote site (FTU-R). The FTU-O corresponding to the plurality of signals generally belongs to same FTTdp CO equipment, and one-to-one corresponds to a plurality of ports on the FTTdp CO equipment. The FTU-R corresponding to each signal belongs to a piece of FTTdp CPE.

Figure 2:
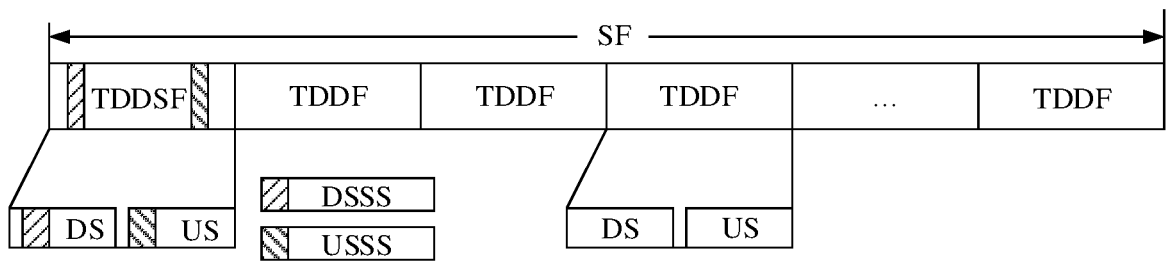
FIG. 2 is a schematic diagram of a frame format according to an embodiment of the present invention.

The G.fast technology uses a TDD duplex manner. In a same timeslot, one of the FTU-O and FTU-R (the FTU-O and FTU-R connected using a same twisted pair cable) corresponding to a same signal is used for sending and the other is used for receiving. FIG. 2 shows a frame format used by the G.fast technology. A super frame (SF) includes one TDD synchronization frame (TDDSF) and a plurality of TDD frames (TDDF). The TDD frame includes a downstream symbol (DS) and an upstream symbol (US). In addition to the downstream and upstream symbols, the TDD synchronization frame includes a downstream synchronization symbol (DSSS) and an upstream synchronization symbol (USSS). The downstream symbol is used to transmit downstream data (data transmitted from the CO side to the user side), and the upstream symbol is used to transmit upstream data (data transmitted from the user side to the CO side).

Figure 1B:
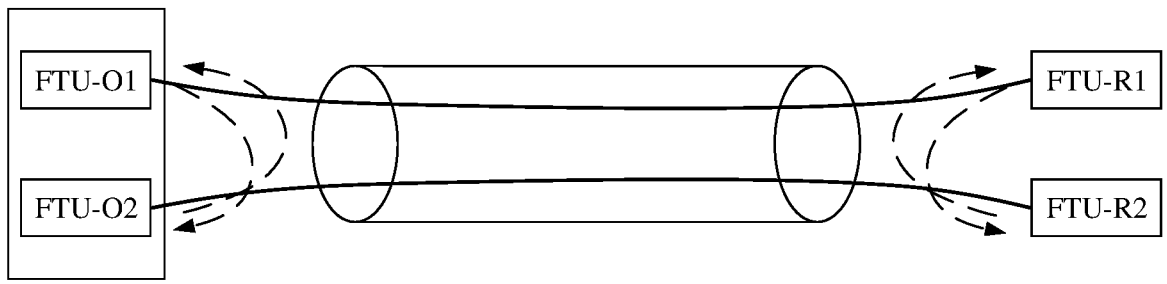
FIG. 1B is a schematic diagram showing how a near-end crosstalk is formed according to an embodiment of the present invention.

Crosstalks occur between the plurality of signals accessed by the FTTdp CO equipment. The crosstalks include a near-end crosstalk and a far-end crosstalk. The near-end crosstalk refers to that a transceiver unit in a sending state causes interference to another transceiver unit in a receiving state. The transceiver units are located at a same end. FIG. 1B is a schematic diagram showing how a near-end crosstalk is formed. Using an FTU-O 1 and an FTU-O 2 as an example, when the FTU-O 1 is in a sending state and the FTU-O 2 is in a receiving state, the FTU-O 1 causes interference to the FTU-O 2, and a near-end crosstalk is formed. Dashed lines in FIG. 1B show four manners of forming a near-end crosstalk. Considering the foregoing cause of the near-end crosstalk, the near-end crosstalk does not occur provided that upstream time and downstream time of the plurality of signals are synchronized (in other words, the transceiver units at the same end corresponding to the plurality of signals are all in a sending state or a receiving state).

Figure 1C:
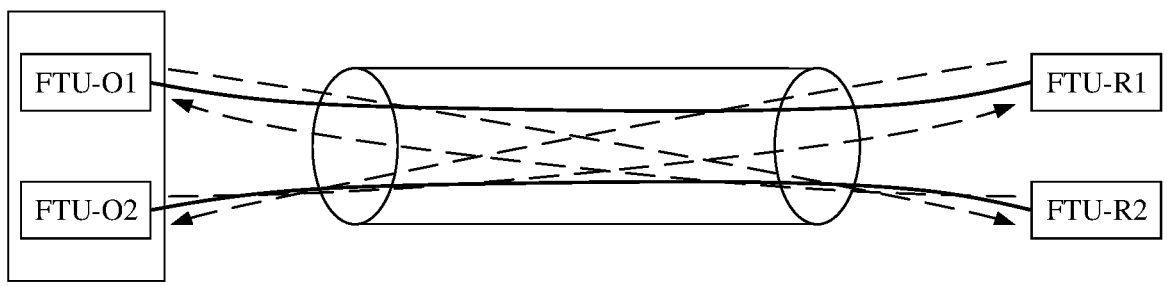
FIG. 1C is a schematic diagram showing how a far-end crosstalk is formed according to an embodiment of the present invention.

The far-end crosstalk refers to that a transceiver unit in a sending state at one end causes interference to a transceiver unit in a receiving state at the other end (the two transceiver units correspond to different signals). FIG. 1C is a schematic diagram showing how a far-end crosstalk is formed. Using the FTU-O 1 and an FTU-R 2 as an example, when the FTU-O 1 is in a sending state and the FTU-R 2 is in a receiving state, the FTU-O 1 causes interference to the FTU-R 2, and a far-end crosstalk is formed. Dashed lines in FIG. 1C show four manners of forming a far-end crosstalk. The far-end crosstalk needs to be resolved by using a vectoring technology. Specifically, the vectoring technology is usually executed on the CO side (for example, the FTrdp CO equipment), and includes downstream precoding and upstream joint reception.

In a downstream precoding technology, the user side (for example, the FTTdp CPE) feeds back far-end crosstalk information to the CO side, and the CO side obtains a "reverse-phase" crosstalk signal based on the far-end crosstalk information and superposes the "reverse-phase" crosstalk signal on a transmit signal on the CO side, to cancel a crosstalk. The downstream precoding technology mainly includes a linear precoding technology and a non-linear precoding technology, namely, QR-Tomlinsin Harashima precoding (QRTHP). Upstream joint reception refers to that when the CO side receives a signal sent by the user side, a disposed crosstalk canceller cancels a crosstalk in the signal after the received signal passes through the crosstalk canceller.

In addition, when the TDD duplex manner is used, an appropriate upstream and downstream transmission proportion may be allocated according to a DTA mechanism and based on changed upstream and downstream traffic. The following briefly describes the DTA mechanism with reference to FIG. 3. The CO side sends a DTA message in downstream robust management channel (RMC) information. The DTA message includes a downstream transmission duration (Mds) and a DTA countdown timer (DTAFDC).

Figure 3:
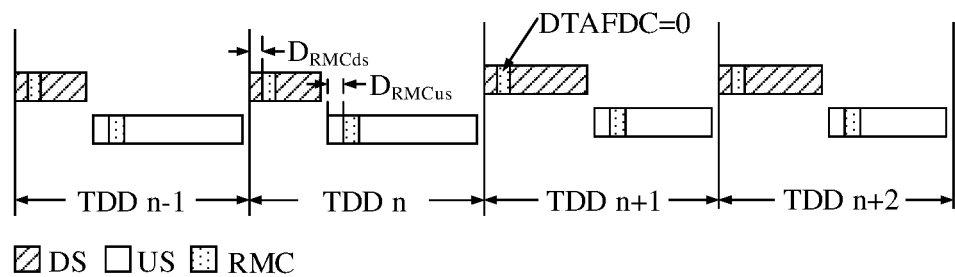
FIG. 3 is a schematic diagram of a DTA mechanism according to an embodiment of the present invention.

The DTA message is repeatedly sent in an RMC message of each TDD frame. Mds in the repeatedly sent DTA message remains unchanged, but a value of DTAFDC gradually decreases. When the value of DTAFDC changes to 0, new Mds takes effect on the CO and user sides. Mds is a downstream transmission duration (a quantity of symbols) in one TDD frame after time adjustment, and may also be referred to as a length of a downstream transmission duration. The new Mds that takes effect refers to adjusting the length of the downstream transmission duration in the TDD frame to Mds and a length of an upstream transmission duration to MF-Mds-A. MF is a quantity of symbols included in one TDD frame, A is a quantity of symbols equivalent to time used for upstream and downstream switching in one TDD frame, and a value of A is usually 1. It should be noted that, as shown in FIG. 3, both the upstream and downstream transmission durations include an RMC symbol, and the upstream and downstream transmission durations are located in a part before the RMC symbol (a length from an end time of previous upstream and downstream switching to a start time of the RMC symbol is fixed). In other words, fixed offsets are DRMCds and DRMCus respectively. An interval between adjacent upstream and downstream transmission durations is used as an upstream and downstream switching time. Each TDD frame includes two periods of upstream and downstream switching time, and a sum of the two periods of upstream and downstream switching time is equal to the A symbols.

Currently, the DTA mechanism is related to only a single port. In a multi-port scenario of the FTrdp CO equipment, during dynamic time adjustment, a downstream RMC channel of a port is damaged by burst noise or the new Mds is temporarily incapable of taking effect on the FTU-R. As a result, asynchronous upstream and downstream time leads to a near-end crosstalk.

To resolve the near-end crosstalk caused by asynchronous upstream and downstream time in the multi-port scenario of the FTTdp CO equipment, if the FTU-R fails to receive the DTA message (it is considered that the FTU-R fails to receive the DTA message when the FTU-R fails to receive downstream RMC information or an error occurs when the FTU-R checks the RMC information) or is temporarily incapable of adjusting the lengths of the upstream and downstream transmission durations, the FTU-R may still be in a sending state in an original upstream transmission duration, but does not send any signal.

However, because the FTU-R has different equivalent impedances in a sending state and in a receiving state, far-end crosstalk channels are also different. Therefore, when the FTU-R is in a sending state and the FTU-O on another channel different from a channel corresponding to the FTU-R is also in a sending state, performance of the vectoring technology used by the FTU-O to resolve a far-end crosstalk existing when the FTU-R is in a receiving state is affected. Alternatively, when the FTU-R is in a receiving state and the FTU-O on another channel is also in a receiving state, performance of the vectoring technology used by the FTU-O to resolve a far-end crosstalk existing when the FTU-R is in a sending state is affected.

To resolve the near-end crosstalk caused by asynchronous upstream and downstream time in the multi-port scenario of the FTTdp CO equipment and impact on performance of the vectoring technology caused by impedance mismatch, the embodiments of the present invention provide a dynamic time adjustment method, apparatus, and system. For details, refer to the following embodiments.

The following describes, with reference to a specific hardware structure, a dynamic time adjustment apparatus in the embodiments of the present invention.

Figure 4:
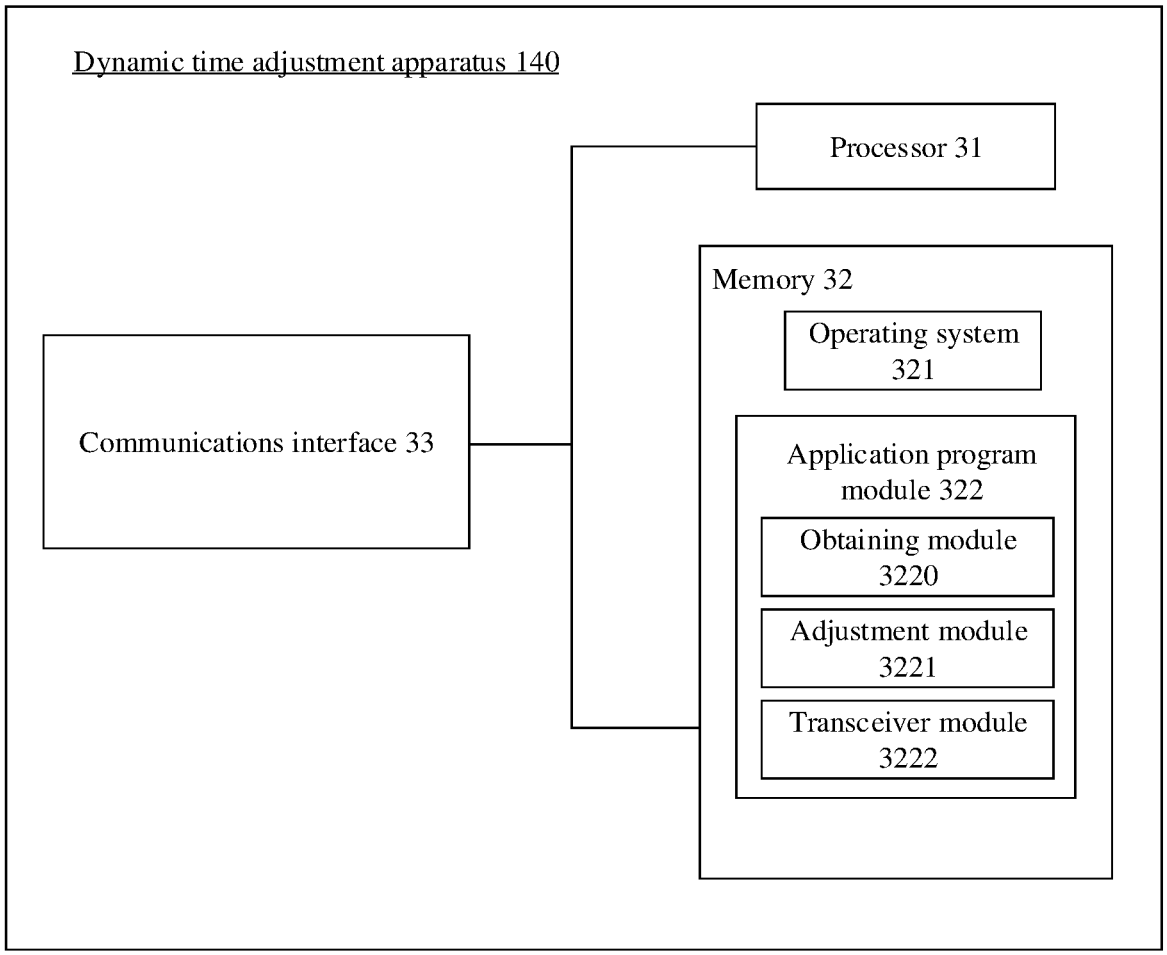
FIG. 4 is a schematic diagram of a structure of a dynamic time adjustment apparatus according to an embodiment of the present invention.

FIG. 4 is a schematic diagram of a structure of a dynamic time adjustment apparatus 140 according to an embodiment of the present invention. The dynamic time adjustment apparatus 140 may be a network-side device, and the network-side device includes but is not limited to the central office equipment in FIG. 1A. Referring to FIG. 4, the dynamic time adjustment apparatus 140 may include components such as a processor 31 with one or more processing cores, a memory 32 including one or more computer readable storage media, and a communications interface 33. The processor 31 may be connected to the memory 32 and the communications interface 33 by using a bus. Persons skilled in the art may understand that the structure shown in FIG. 4 does not constitute a limitation to the dynamic time adjustment apparatus 140, and the dynamic time adjustment apparatus 140 may include more or fewer components than those shown in the figure, or some components may be combined, or a different component deployment may be used.

The processor 31 is a control center of the dynamic time adjustment apparatus 140, and uses various interfaces and lines to connect parts of the entire dynamic time adjustment apparatus 140. By running or executing a software program and/or an application program module stored in the memory 32 and invoking data stored in the memory 32, the processor 31 implements various functions of the dynamic time adjustment apparatus 140 and processes data, to perform overall monitoring on the dynamic time adjustment apparatus 140. Optionally, the processor 31 may include one or more processing units, and the processing unit may be a central processing unit (CPU), a network processor (NP), or the like.

The communications interface 33 may be implemented as a communications chip. The communications chip may include a receiving module, a transmitting module, a modulation/demodulation module, and the like, and is configured to modulate/demodulate information and send or receive the information by using a wireless signal. The communications interface 33 is controlled by the processor 31.

The memory 32 may be configured to store various data, such as various configuration parameters, and a software program and/or an application program module. The software program and/or the application program module may be executed by the processor 31. The memory 32 may mainly include a program storage zone and a data storage zone. The program storage zone may store an operating system 321 and an application program module 322, for example, an obtaining module, an adjustment module, and a transceiver module, required by at least one function. The data storage zone may store data created based on use of the dynamic time adjustment apparatus 140, for example, a length of a new downstream transmission duration, a length of a currently used downstream transmission duration, and the like. In addition, the memory 32 may include a high speed random access memory, and may further include a nonvolatile memory such as at least one magnetic disk storage component, a flash memory component, or another volatile solid-state storage component. Correspondingly, the memory 32 may further include a storage controller, to provide the processor 31 with access to the memory 32.

The application program module 322 includes at least an obtaining module 3220 configured to obtain a length of a new downstream transmission duration, an adjustment module 3221 configured to adjust lengths of upstream and downstream transmission durations, and a transceiver module 3222 configured to transmit a signal.

The obtaining module 3220 is configured to obtain a length Mds_New of a new downstream transmission duration.

The adjustment module 3221 is configured to adjust a length of a downstream transmission duration of a first transceiver from a length Mds_Old of a currently used downstream transmission duration to Mds_New, and adjust a length of an upstream transmission duration of the first transceiver from a length Mus_Old of a currently used upstream transmission duration to a length Mus_New of a new upstream transmission duration, where the first transceiver is any one of at least two transceivers of the network-side device, a sum of Mds_New and Mus_New is equal to a length of one transmission frame minus a length of an upstream and downstream switching duration, and the upstream and downstream switching duration is a duration spent by the first transceiver to switch from a receiving state to a sending state and switch from the sending state to the receiving state.

The transceiver module 3222 is configured to: when Mds_New is greater than Mds_Old, keep silent or send an idle symbol or another symbol with known content in a transition zone of the new downstream transmission duration of the first transceiver, where the transition zone of the new downstream transmission duration of the first transceiver is an additional zone of the new downstream transmission duration compared with the currently used downstream transmission duration.

Alternatively, when Mds_New is less than Mds_Old, the transceiver module 3222 is configured to receive a quiet symbol, an idle symbol, or another symbol with known content in a transition zone of the new upstream transmission duration of the first transceiver, where the transition zone of the new upstream transmission duration of the first transceiver is an additional zone of the new upstream transmission duration compared with the currently used upstream transmission duration.

Figure 5:
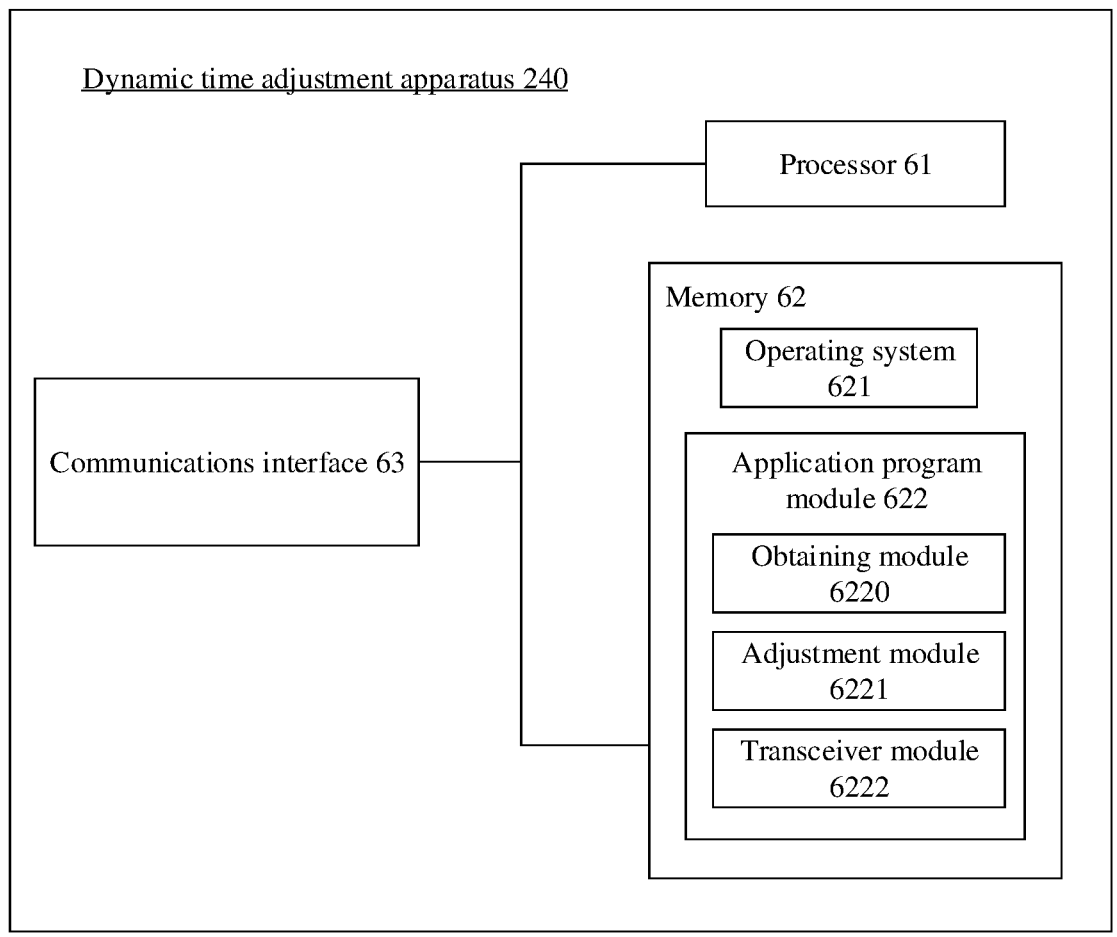
FIG. 5 is a schematic diagram of a structure of another dynamic time adjustment apparatus according to an embodiment of the present invention.

FIG. 5 is a block diagram of a structure of a dynamic time adjustment apparatus 240 according to an embodiment of the present invention. The dynamic time adjustment apparatus 240 may be the foregoing user-side device, and the user-side device includes but is not limited to the customer premises equipment in FIG. 1A. Referring to FIG. 5, the dynamic time adjustment apparatus 240 may include components such as a processor 61 with one or more processing cores, a memory 62 including one or more computer readable storage media, and a communications interface 63. The processor 61 may be connected to the memory 62 and the communications interface 63 by using a bus. Persons skilled in the art may understand that a structure shown in FIG. 5 does not constitute a limitation to the dynamic time adjustment apparatus 240, and the dynamic time adjustment apparatus 240 may include more or fewer components than those shown in the figure, or some components may be combined, or a different component deployment may be used.

The processor 61 is a control center of the dynamic time adjustment apparatus 240, and uses various interfaces and lines to connect parts of the entire dynamic time adjustment apparatus 240. By running or executing a software program and/or an application program module stored in the memory 62 and invoking data stored in the memory 62, the processor 61 implements various functions of the dynamic time adjustment apparatus 240 and processes data, to perform overall monitoring on the dynamic time adjustment apparatus 240.

Optionally, the processor 61 may include one or more processing units, and the processing unit may be a central processing unit (CPU), a network processor (NP), or the like.

The communications interface 63 may be implemented as a communications chip. The communications chip may include a receiving module, a transmitting module, a modulation/demodulation module, and the like, and is configured to modulate/demodulate information and receive or send the information by using a wireless signal. The communications interface 63 is controlled by the processor 61.

The memory 62 may be configured to store various data, such as various configuration parameters, and a software program and/or an application program module. The software program and/or the application program module may be executed by the processor 61. The memory 62 may mainly include a program storage zone and a data storage zone. The program storage zone may store an operating system 621 and an application program module 622, for example, an obtaining module, an adjustment module, and a transceiver module, required by at least one function. The data storage zone may store data created based on use of the dynamic time adjustment apparatus 240, for example, a length of a new downstream transmission duration, a length of a currently used downstream transmission duration, and the like. In addition, the memory 62 may include a high speed random access memory, and may further include a nonvolatile memory such as at least one magnetic disk storage component, a flash memory component, or another volatile solid-state storage component. Correspondingly, the memory 62 may further include a storage controller, to provide the processor 61 with access to the memory 62.

The application program module 622 includes at least an obtaining module 6220 configured to obtain a length of a new downstream transmission duration, an adjustment module 6221 configured to adjust lengths of upstream and downstream transmission durations, and a transceiver module 6222 configured to transmit a signal.

The obtaining module 6220 is configured to obtain a length Mds_New of a new downstream transmission duration.

The adjustment module 6221 is configured to adjust a length of a downstream transmission duration of a first transceiver of the user-side device from a length Mds_Old of a currently used downstream transmission duration to Mds_New, and adjust a length of an upstream transmission duration of the first transceiver of the user-side device from a length Mus_Old of a currently used upstream transmission duration to a length Mus_New of a new upstream transmission duration, where a sum of Mds_New and Mus_New is equal to a length of one transmission frame minus a length of an upstream and downstream switching duration, and the upstream and downstream switching duration is a duration spent by the transceiver of the user-side device to switch from a receiving state to a sending state and switch from the sending state to the receiving state.

The transceiver module 3222 is configured to: when Mds_New is greater than Mds_Old, receive a quiet symbol, an idle symbol, or another symbol with known content in a transition zone of the new upstream transmission duration of the transceiver of the user-side device, where the transition zone of the new downstream transmission duration of the transceiver of the user-side device is an additional zone of the new downstream transmission duration compared with the currently used downstream transmission duration.

Alternatively, when Mds_New is less than Mds_Old, the transceiver module 3222 is configured to keep silent or send an idle symbol or another symbol with known content in a transition zone of the new downstream transmission duration of the transceiver of the user-side device, where the transition zone of the new upstream transmission duration of the transceiver of the user-side device is an additional zone of the new upstream transmission duration compared with the currently used upstream transmission duration.

Figure 6:
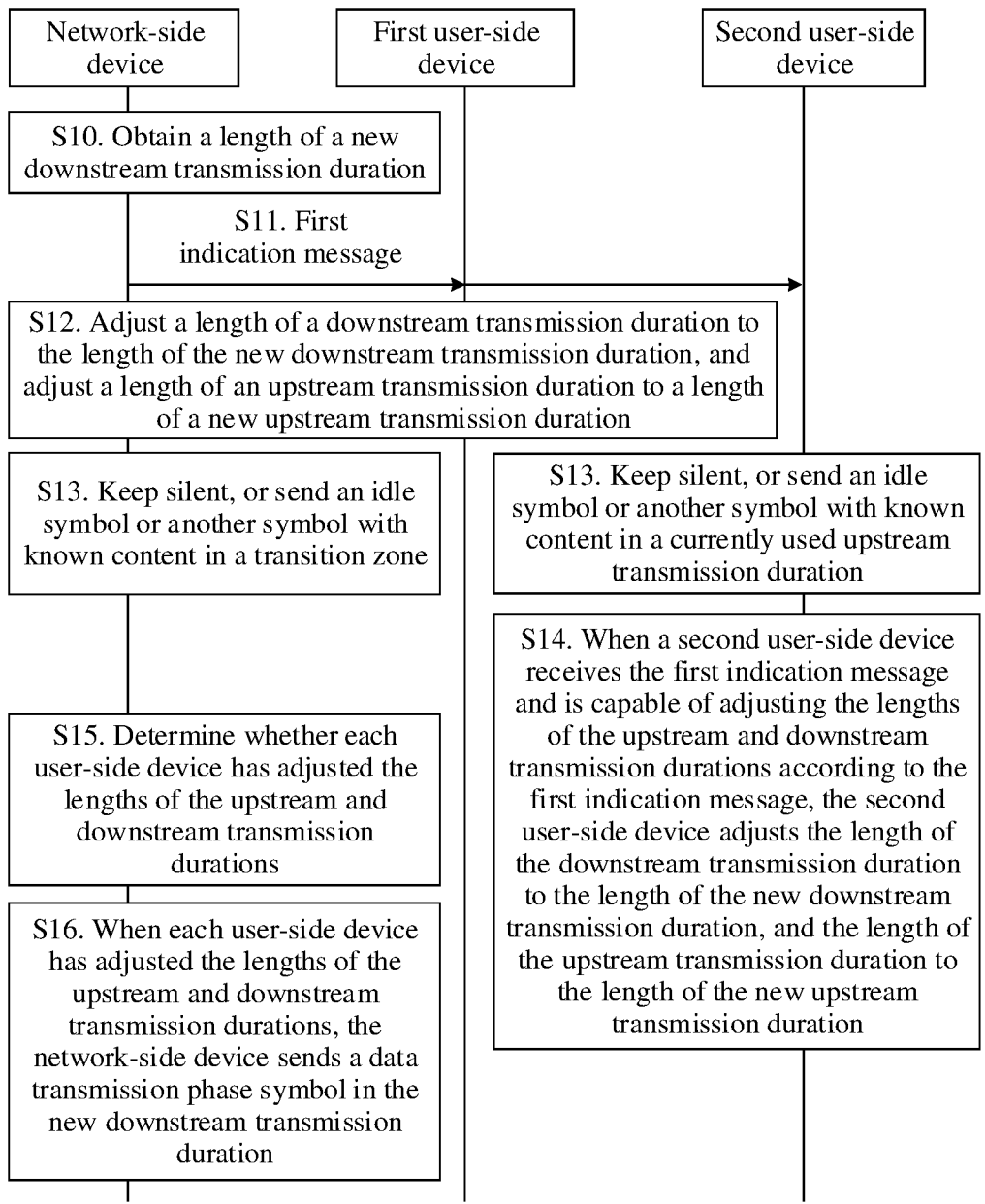
FIG. 6 is a flowchart of a dynamic time adjustment method according to an embodiment of the present invention.

An embodiment of the present invention provides a dynamic time adjustment method. Referring to FIG. 6, the method is executed by a network-side device (the network-side device includes but is not limited to the central office equipment in FIG. 1A) and a user-side device (the user-side device includes but is not limited to the customer premises equipment in FIG. 1A). The network-side device includes at least two transceivers. The dynamic time adjustment method provided in the present invention may be applied to only some transceivers (at least two transceivers) or all transceivers of the network-side device. This embodiment of the present invention is described by using an example in which lengths of upstream and downstream transmission durations need to be adjusted for all transceivers of the network-side device. In another embodiment, the lengths need to be adjusted for only some transceivers (for example, at least two transceivers) of the network-side device. In a method procedure shown in FIG. 6, a length of a new downstream transmission duration is greater than a length of a currently used downstream transmission duration, and the dynamic time adjustment method includes steps S10 to S16.

Step S10: The network-side device obtains the length of the new downstream transmission duration.

In one implementation of this embodiment of the present invention, the network-side device may determine the length of the new downstream transmission duration based on at least one of conditions such as traffic and power consumption of the at least two transceivers of the network-side device. The action of determining the length of the new downstream transmission duration may be performed by a unit that has a computing function, such as a CPU, or a digital signal processing (DSP) chip in the network-side device.

In another implementation of this embodiment of the present invention, the network-side device may receive a configuration parameter sent by a dynamic resource allocation (DRA) entity or a vectoring control entity (VCE) by using a transmission opportunity (TXOP) primitive, and determine the length of the new downstream transmission duration according to content of the configuration parameter. For example, the configuration parameter includes the length of the new downstream transmission duration.

After obtaining the length Mds_New of the new downstream transmission duration, the network-side device may determine a length Mus_New of a new upstream transmission duration based on the length of the new downstream transmission duration because a sum of the length of the upstream transmission duration and the length of the downstream transmission duration is equal to a total length of one transmission frame minus an upstream and downstream switching duration. The transmission frame may specifically be a TDD frame. The upstream and downstream switching duration is a duration spent by the transceiver of the network-side device to switch from a receiving state to a sending state and switch from the sending state to the receiving state, in other words, a sum of a duration of switching from the receiving state to the sending state and a duration of switching from the sending state to the receiving state.

In this embodiment of the present invention, downstream is from the network-side device to the user-side device, and upstream is from the user-side device to the network-side device. The downstream transmission duration is continuous time formed by symbols used for downstream transmission in one transmission frame, and the upstream transmission duration is continuous time formed by symbols used for upstream transmission in one transmission frame. The length of the downstream transmission duration and the length of the upstream transmission duration respectively indicate quantities of symbols included in the downstream transmission duration and the upstream transmission duration.

Certainly, in another embodiment, the network-side device may alternatively first obtain the length of the new upstream transmission duration, and then determine the length of the new downstream transmission duration based on the length of the new upstream transmission duration.

After obtaining the length of the new downstream transmission duration, the network-side device may further compare the length of the new downstream transmission duration with the length of the currently used downstream transmission duration, to facilitate execution of subsequent steps.

Step S11: The network-side device sends a first indication message to the user-side device, where the first indication message is used to indicate the length of the new downstream transmission duration.

In this step, the network-side device may send the first indication message (may be cDTA req Type1) in a downstream RMC symbol. Alternatively, the network-side device may send the first indication message through an embedded operations channel (EOC).

The first indication message includes TDD configuration information, for example, Mds_New or Mus_New, to indicate that the new downstream transmission duration includes Mds_New symbols. When Mds_New is greater than Mds_Old, Mds_Old is a quantity of symbols included in the currently used downstream transmission duration. Because Mds_New is related to Mus_New, the first indication message is also used to indicate that the new upstream transmission duration includes Mus_New symbols. When Mus_New is less than Mus_Old, Mus_Old is a quantity of symbols included in a currently used upstream transmission duration.

In this embodiment of the present invention, the network-side device sends one first indication message by using each transceiver. The first indication messages sent by different transceivers are used to instruct transceivers of the user-side device corresponding to the different transceivers to perform dynamic time adjustment. The first indication messages sent by the different transceivers include a same length of the new downstream transmission duration.

Further, the first indication message further includes effective time. The first indication messages sent by the different transceivers may include same effective time. The effective time of the first indication message refers to that the user-side device is required or expected to adjust the length of the downstream transmission duration to the length of the new downstream transmission duration, and adjust the length of the upstream transmission duration to the length of the new upstream transmission duration.

The first indication message may be in a format of a DTA message, to be specific, the network-side device sends Mds or Mus to the user-side device by sending a DTA message in the downstream RMC symbol. Using Mds as an example, the DTA message includes Mds and DTAFDC (used to indicate effective time). The new downstream transmission duration indicated by Mds includes Mds_New symbols. DTAFDC is used to indicate effective time TDD 1. The effective time is time that is determined by the network-side device for adjusting the length of the downstream transmission duration to the length of the new downstream transmission duration. The network-side device may repeatedly send the DTA message in a TDD frame before TDD 1 (including TDD 1). Each time when the DTA message is sent, a value of Mds remains unchanged and a value of DTAFDC gradually decreases (i is subtracted from each transmission frame) until the value of DTAFDC changes to 0 when the time is TDD 1.

In this embodiment of the present invention, the first indication message is used to instruct to change the length of the downstream transmission duration to Mds_New, and change the length of the upstream transmission duration to MF-Mds_New-A. MF-Mds_New-A indicates the length of the new upstream transmission duration. Alternatively, the first indication message is used to instruct to change the length of the upstream transmission duration to Mus_New, and change the length of the downstream transmission duration to MF-Mus_New-A. MF-Mus_New-A indicates the length of the new downstream transmission duration. MF is a quantity of symbols included in one TDD frame, and A is a quantity of symbols equivalent to time for upstream and downstream switching in one TDD frame. Generally, the value of A is 1.

Correspondingly, the user-side device receives the first indication message sent by the network-side device in step S11.

Step S12: The network-side device and a first user-side device adjust the length of the downstream transmission duration to the length of the new downstream transmission duration, and adjust the length of the upstream transmission duration to a length of a new upstream transmission duration.

The first user-side device is a user-side device that receives the first indication message and is capable of adjusting, according to the first indication message, the length of the downstream transmission duration.

Further, the user-side device may further include a second user-side device. The second user-side device is a user-side device that does not receive the first indication message or is temporarily incapable of adjusting the length of the downstream transmission duration according to the first indication message. The second user-side device keeps current TDD configuration and does not adjust the lengths of the upstream and downstream transmission durations.

The network-side device includes the at least two transceivers. Therefore, an adjustment process of the network-side device may include: The network-side device adjusts the length of the downstream transmission duration of a first transceiver from the length Mds_Old of the currently used downstream transmission duration to Mds_New, and adjusts the length of the upstream transmission duration of the first transceiver from a length Mus_Old of the currently used upstream transmission duration to the length Mus_New of the new upstream transmission duration. The first transceiver is any one of the at least two transceivers of the network-side device.

That the network-side device adjusts the length of the downstream transmission duration to the length of the new downstream transmission duration may include:

Mds_New symbols starting from a first symbol are used as symbols in the downstream transmission duration without changing a position of the first symbol in the downstream transmission duration.

That the network-side device adjusts the length of the upstream transmission duration to the length of the new upstream transmission duration may include:

MF-Mds_New-A symbols starting from a last symbol are used as symbols in the upstream transmission duration without changing a position of the last symbol in the upstream transmission duration.

The following describes the adjustment process by using a number of a symbol in the TDD frame.

Adjust the length of the downstream transmission duration: In a first case, if a $1^{st}$ symbol is marked as the first symbol, use an $(Mds\_New)^{th}$ symbol (a quantity of symbols in the new downstream transmission duration) as the last symbol in the downstream transmission duration without changing the position of the first symbol in the downstream transmission duration. In a second case, if a $0^{th}$ symbol is marked as the first symbol, use an $(Mds\_New-1)^{th}$ symbol as the last symbol in the downstream transmission duration without changing the position of the first symbol in the downstream transmission duration.

Adjust the length of the upstream transmission duration: In a first case, if an $(MF-A)^{th}$ symbol is marked as the last symbol, use a last but MF-A-Mds_New symbol as the first symbol in the upstream transmission duration without changing the position of the last symbol in the upstream transmission duration. In a second case, if an $(MF-A-1)^{th}$ symbol is marked as the last symbol, use a last but MF-A-1-Mds_New symbol as the first symbol in the upstream transmission duration without changing the position of the last symbol in the upstream transmission duration.

Further, the method further includes: When adjusting the length of the upstream transmission duration to the length of the new upstream transmission duration, the first user-side device adjusts a position of an RMC symbol in the upstream transmission duration, specifically, moves the RMC symbol backward by Mds_New-Mds_Old symbols.

After adjusting the lengths of the upstream and downstream transmission durations, the network-side device processes symbols in the downstream transmission duration by using a downstream precoding technology, and processes symbols in the upstream transmission duration by using a joint reception technology.

In this embodiment of the present invention, the network-side device adjusts the length of the downstream transmission duration to the length of the new downstream transmission duration. Specifically, the network-side device adjusts a length of a sending duration by adjusting configuration of a transmit end. The user-side device adjusts the length of the downstream transmission duration to the length of the new downstream transmission duration. Specifically, the user-side device adjusts a length of a receiving duration by adjusting configuration of a receive end. The network-side device adjusts the length of the upstream transmission duration to the length of the new upstream transmission duration. Specifically, the network-side device adjusts the length of the receiving duration by adjusting configuration of the receive end. The user-side device adjusts the length of the upstream transmission duration to the length of the new upstream transmission duration. Specifically, the user-side device adjusts the length of the sending duration by adjusting configuration of the transmit end.

It is easily learned that, in this embodiment of the present invention, the network-side device and the user-side device simultaneously perform step S12, for example, both perform after step S11 (specifically, until the value of DTAFDC changes to 0 in the TDD 1 frame).

Step S13: The network-side device keeps silent, or sends an idle symbol or another symbol with known content in a transition zone, where the transition zone is from an (Mds_Old+1)$^{th}$ symbol to an (Mds_New)$^{th}$ symbol (herein, a 1$^{st}$ symbol is the first symbol of the TDD frame, and if a 0$^{th}$ symbol is the first symbol, the transition zone is from an (Mds_Old)$^{th}$ symbol to an (Mds_New−1)$^{th}$ symbol). The second user-side device keeps silent, or sends an idle symbol or another symbol with known content in the currently used upstream transmission duration.

The transition zone is a transition zone of the new downstream transmission duration, and specifically is an additional zone of the new downstream transmission duration compared with the currently used downstream transmission duration, in other words, a zone from the (Mds_Old+1)$^{th}$ to the (Mds_New)$^{th}$ symbols (the 1$^{st}$ symbol is the first symbol, and if the 0$^{th}$ symbol is the first symbol, the transition zone is from the (Mds_Old)$^{th}$ to the (Mds_New−1)$^{th}$ symbols).

In this step, the second user-side device is a user-side device that does not receive the first indication message or that receives the first indication message but is temporarily incapable of adjusting the length of the downstream transmission duration according to the first indication message. The user-side device keeps silent, or sends an idle symbol or another symbol with known content in the currently used upstream transmission duration.

Specifically, the user-side device receives the RMC symbol that bears the first indication message. The user-side device demodulates content in the RMC symbol according to a bit bearer table of the RMC symbol. During demodulation, the user-side device checks the demodulated content in the RMC symbol. If the check fails, the user-side device discards the RMC symbol. In this case, when discarding the RMC symbol, the user-side device does not know information content borne in the RMC symbol. However, as long as the RMC symbol is discarded, the user-side device considers that the first indication message is not received, and keeps silent, or sends an idle symbols or another symbol with known content in the currently used upstream transmission duration.

An idle symbol (idle symbol) on the network-side device refers to transmitting, on a symbol that has no data to be sent, a signal that is 0 and that is obtained by encoding an input signal of a precoder. An idle symbol on the user-side device refers to transmitting, on a symbol that has no data to be sent, a signal that is 0 and an input signal of a modulator.

Keeping silent refers to filling a quiet symbol in the transition zone. The quiet symbol indicates that although a transmitter is in a sending state, the transmitter does not send a symbol. An external representation of the quiet symbol is that a device does not send a signal.

Another symbol with known content (pattern symbol) is a symbol that is known to both a network-side device and a user-side device at both ends of a line. Different symbols with known content may be transmitted on different lines. Specifically, both network-side device and user-side device know content of data transmitted on a symbol. For example, determined information is borne on a determined subcarrier or subcarrier set. Two bits "01" are borne on a subcarrier whose subcarrier sequence number is 10n, two bits "10" are borne on a subcarrier whose subcarrier sequence number is 10n+5, and other subcarriers do not bear data, where, n=0, 1, 2, . . . .

Because the idle symbol, the quiet symbol, and the another symbol with known content do not bear useful information, even if some user-side devices have not adjusted the lengths of the upstream and downstream transmission durations, downstream transmission performance of other lines is not affected.

The second user-side device keeps silent or sends an idle symbol or another symbol with known content (the network-side device cancels crosstalk generated by the second user-side device by using a vectoring technology) in the upstream transmission duration. Therefore, upstream transmission performance of the first user-side device is not affected.

The network-side device or the second user-side device generates a quiet symbol by setting modulator inputs (Zi') of all subcarriers of the transceiver to 0 (if an input of the modulator is 0, an output of the modulator is 0, and a symbol obtained after subsequent processing is a quiet symbol). When the quiet symbol is sent, transmit power of a U interface (an interface between the network-side device or the second user-side device and a line) is 0. (The output of the modulator may be considered as a voltage signal. If the voltage signal is 0, and the power is also 0.) The network-side device generates an idle symbol by setting precoder inputs (Zi) of all the subcarriers of the transceiver to 0. The second user-side device generates an idle symbol by setting the modulator inputs (Zi') of the subcarriers of the transceiver to 0. The user-side device generates the quiet symbol and the idle symbol in a same manner. The quiet symbol and the idle symbol are same symbols.

Specifically, the following describes a process in which the transceiver generates a symbol. Data from an upper layer (physical media specific-transmission convergence (PMS-TC)) enters a data symbol encoder through a δ interface. After encoding an input bit stream, the data symbol encoder maps the bit stream to each subcarrier according to constellation mapping. Zi indicates a value mapped to each subcarrier, and i indicates a sequence number of a subcarrier. For example, if there are 2048 subcarriers, Zi ranges from Z0 to Z2047. Zi is processed by the precoder to obtain Zi'. Zi' ranges from Z0' to Z2047'. The precoder is configured to perform precoding processing on each subcarrier. The precoded Zi' enters the modulator of the subcarrier. Specifically, inverse discrete Fourier transform (IDFT) is first performed on Zi' in the modulator of the subcarrier, to convert the signal from frequency domain to time domain, in other words, a time domain signal is output after IDFT. If the input of IDFT is all 0s, the output is also all 0s. In other words, if Zi' is all 0s, the time domain signal output after IDFT is all 0s. After being processed by subsequent modules (Cyclic extension and Windowing) of the modulator, symbols obtained are still all-0 symbols. In this way, all-0 symbols, namely, quiet symbols arrive at the U interface. When the output is the quiet symbol, the power value of the U interface is 0. It should be noted that, if Zi is all 0s, the obtained Zi' may not be all 0s because the precoder also considers information sent by other lines. If Zi of other lines is not all 0s, Zi' after precoding performed by the precoder is not all 0s.

In this embodiment of the present invention, the network-side device may keep silent or send an idle symbol or another symbol with known content in the transition zone by performing a discontinuous operation (DO) and configuring TXOP information.

Specifically, the network-side device receives the configuration parameter sent by the DRA entity or the VCE in the TXOP primitive. The configuration parameter is used to indicate a quantity of symbols corresponding to a normal operation duration (NOI) and a discontinuous operation duration (DOI). The DOI includes a signal sending zone and a non-signal sending zone.

In one implementation, the configuration parameter may include a TTR and a TA. The TTR in the configuration parameter is used to indicate a quantity of symbols corresponding to the NOI (namely, normal operation duration). The TA in the configuration parameter is used to indicate a silent zone in the DOI (namely, discontinuous operation duration). The silent zone includes the transition zone (TZ).

The network-side device sets the TTR and the TA based on the configuration parameter, to keep silent, or send an idle symbol or another symbol with known content in the transition zone without affecting performance of any other device.

In this embodiment, the TTR and the TA are respectively TTRds and TAds. TTRds and TAds are used to indicate a zone in which the network-side device keeps silent in the new downstream transmission duration. The zone in which the network-side device keeps silent in the new downstream transmission duration includes the transition zone in the new downstream transmission duration.

The zone in which the network-side device keeps silent in the new downstream transmission duration is usually equivalent to the transition zone in the new downstream transmission duration. However, the zone in which the network-side device keeps silent in the new downstream transmission duration may alternatively be longer than the transition zone in the new downstream transmission duration. This includes the following three cases:

In a first case, an end position of the zone in which the network-side device keeps silent in the new downstream transmission duration is the same as an end position of the transition zone in the new downstream transmission duration. A start position of the zone in which the network-side device keeps silent in the new downstream transmission duration is before a start position of the transition zone in the new downstream transmission duration. For example, the end position of the zone in which the network-side device keeps silent and the end position of the transition zone in the new downstream transmission duration are both the $(Mds\_New)^{th}$ symbol in the new downstream transmission duration. The start position of the transition zone in the new downstream transmission duration is the $(Mds\_Old+1)^{th}$ symbol in the new downstream transmission duration, and the start position of the zone in which the network-side device keeps silent is the $(Mds\_Old-1)^{th}$ symbol in the new downstream transmission duration.

In a second case, a start position of the zone in which the network-side device keeps silent in the new downstream transmission duration is the same as a start position of the transition zone in the new downstream transmission duration. An end position of the zone in which the network-side device keeps silent in the new downstream transmission duration is after an end position of the transition area in the new downstream transmission duration. For example, both the start position of the zone in which the network-side device keeps silent and the start position of the transition area in the new downstream transmission duration are the $(Mds\_Old+1)^{th}$ symbol in the new downstream transmission duration. The end position of the transition zone in the new downstream transmission duration is the $(Mds\_New)^{th}$ symbol in the new downstream transmission duration, and the end position of a zone in which the network-side device keeps silent is before a downstream RMC symbol of a next TDD frame.

In a third case, a start position of the zone in which the network-side device keeps silent in the new downstream transmission duration is before a start position of the transition zone in the new downstream transmission duration. An end position of the zone in which the network-side device keeps silent in the new downstream transmission duration is after an end position of the transition zone in the new downstream transmission duration. For example, the start position of the transition zone in the new downstream transmission duration is the $(Mds\_Old+1)^{th}$ symbol in the new downstream transmission duration. The end position of the transition zone in the new downstream transmission duration is the $(Mds\_New)^{th}$ symbol in the new downstream transmission duration. The start position of the zone in which the network-side device keeps silent is the $(Mds\_Old-1)^{th}$ symbol in the new downstream transmission duration. The end position of the zone in which the network-side device keeps silent is before a downstream RMC symbol of a next TDD frame.

Correspondingly, in step S10, the network-side device may determine the length of the new downstream transmission duration based on the TTR and the TA in the configuration parameter. For example, if the configuration parameters include TTRds and TAds, Mds_New may be calculated in the following formula: Mds_New=Mds_Old+TAds.

In another implementation, in addition to the TTR and the TA, the configuration parameter may include Mds_New (or Mus_New).

Further, when the network-side device sends the first indication message by using the downstream RMC symbol, in addition to Mds_New or Mus_New, the first indication message may include the TTR and the TA in the configuration parameter.

After receiving the TXOP primitive in an $N^{th}$ super frame, and the network-side device may make the configuration parameter take effect in an $(N+2)^{th}$ super frame. It should be noted that, in this embodiment, when the network-side device receives the TXOP primitive, the parameter in the TXOP primitive does not take effect at the same time. For example, the network-side device first adjusts the lengths of the upstream and downstream transmission durations based on Mds_New or Mus_New. In this case, TTR=Mds_Old−DRMCds. The network-side device keeps silent, or sends an idle symbol or another symbol with known content based on the TTR and the TA. When the user-side device adjusts the lengths of the upstream and downstream transmission durations, the TTR changes to Mds_New−DRMCds. In this way, the network-side device can send a data transmission phase symbol in the new downstream transmission duration.

Figure 6A:
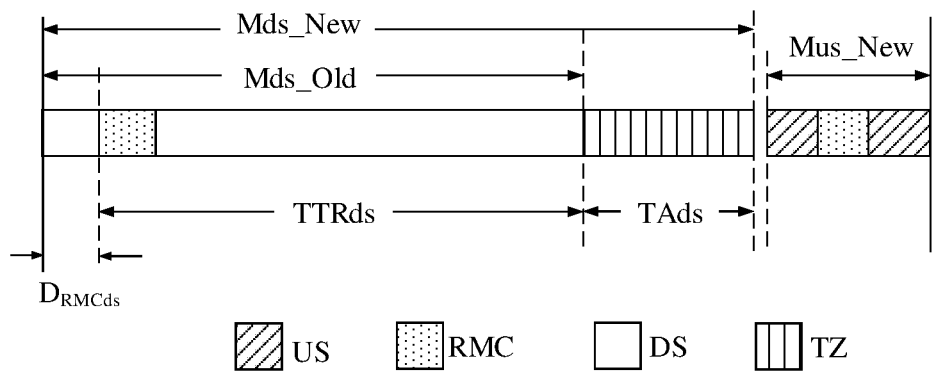
FIG. 6A is a schematic diagram of a frame format according to an embodiment of the present invention.

FIG. 6A is a schematic diagram of a TDD frame format according to an embodiment of the present invention. TTRds=Mds_Old−DRMCds and TAds=Mds_New−Mds_Old. DRMCds indicates offset of the RMC symbol in the downstream transmission duration (in other words, a quantity of symbols between the RMC symbol and a start position of the TDD frame).

The network-side device sends the data transmission phase symbol in another zone of the downstream transmission duration different from the transition zone, and the first user-side device sends a data transmission phase symbol in the upstream transmission duration. The data transmission phase symbol is any symbol sent by the network-side device or the first user-side device during data transmission (showtime). The data transmission phase symbol includes but is not limited to a symbol carrying to-be-transmitted data, a quiet symbol, an idle symbol, and the like.

Step S14: When a second user-side device receives the first indication message and is capable of adjusting the lengths of the upstream and downstream transmission durations according to the first indication message, or when the second user-side device is capable of adjusting the lengths of the upstream and downstream transmission durations according to a previously received first indication message, the second user-side device adjusts the length of the downstream transmission duration to the length of the new downstream transmission duration, and the length of the upstream transmission duration to the length of the new upstream transmission duration.

When the second user-side device has adjusted the lengths of the upstream and downstream transmission durations, the second user-side device sends the data transmission phase symbol in the upstream transmission duration.

In this step, the second user-side device sends the data transmission phase symbol in the upstream transmission duration.

Step S15: The network-side device determines whether each user-side device has adjusted the lengths of the upstream and downstream transmission durations.

The network-side device determines whether each user-side device has adjusted the length of the downstream transmission duration to the length of the new downstream transmission duration, and adjusted the length of the upstream transmission duration to the length of the new upstream transmission duration.

In one implementation of this embodiment of the present invention, the network-side device determines, by detecting the position of the RMC symbol in the upstream transmission duration, whether the user-side device has adjusted the lengths of the upstream and downstream transmission durations. If the position of the RMC symbol is moved backward by Mds_New-Mds_Old symbols compared with the position before adjustment, the user-side device has adjusted the lengths of the upstream and downstream transmission durations. If the position is not moved backward, the user-side device has not adjusted the upstream and downstream transmission durations.

In another implementation of this embodiment of the present invention, the network-side device may further determine, based on the symbol sent by the user-side device, whether the user-side device has adjusted the lengths of the upstream and downstream transmission durations. If the user-side device sends the data transmission phase symbol in the upstream transmission duration, the user-side device has adjusted the lengths of the upstream and downstream transmission durations. If the user-side device keeps silent, or sends an idle symbol or another symbol with known content in the upstream transmission duration, the user-side device has not adjusted the lengths of the upstream and downstream transmission durations. Specifically, the network-side device may determine based on an upstream symbol sent by the user-side device in last Mus_New symbols of a TDD frame.

Step S16: When each user-side device has adjusted the lengths of the upstream and downstream transmission durations, the network-side device sends a data transmission phase symbol in the new downstream transmission duration.

In this step, after determining that each user-side device has adjusted the lengths of the upstream and downstream transmission durations, the network-side device may send the data transmission phase symbol in the transition zone. Therefore, the network-side device sends the data transmission phase symbol in the new downstream transmission duration.

Further, the dynamic time adjustment process in steps S10 to S16 may require many TDD frames, which may include a sync frame. If a sync frame is required in the dynamic time adjustment process, the method may include:

The first user-side device sends a synchronization symbol in the first symbol in the new upstream transmission duration.

The second user-side device sends or does not send a sync symbol in the first symbol in the currently used upstream transmission duration.

In the G.fast standard, a sync symbol is a special symbol used to train a canceller (canceller) coefficient. The canceller coefficient is a coefficient for cancellation in an upstream joint reception technology.

Because the second user-side device has not adjusted the lengths of the upstream and downstream transmission durations, if the second user-side device needs to send the sync symbol, the second user-side device can send the sync symbol only at the position of the first symbol of Mus_Old. The sync symbol sent by the second user-side device is not aligned with one sent by the first user-side device. The sync symbol sent by the second user-side device is invalid. Even if the network-side device receives the symbol, the network-side device cannot be used to train the canceller coefficient. Therefore, the second user-side device may not send the sync symbol.

In the G.fast standard, if one TDD frame has 36 symbols, a sync frame is sent every eight TDD frames. If one TDD frame has 23 symbols, a sync frame is sent every 12 TDD frames. A quantity of symbols in one TDD frame is determined during handshake (handshake). The dynamic time adjustment may require many TDD frames, which may include the sync frame. When the sync frame is included, the user-side device sends the sync symbol in the foregoing manner.

The following further describes the method provided in this embodiment of the present invention by using FIG. 6B to FIG. 6E as an example. In this example, three signals correspond to three transceivers (FTU-O 1 to FTU-O 3) of the network-side device. In practice, there may be more or less signals (at least two signals).

Figure 6B:
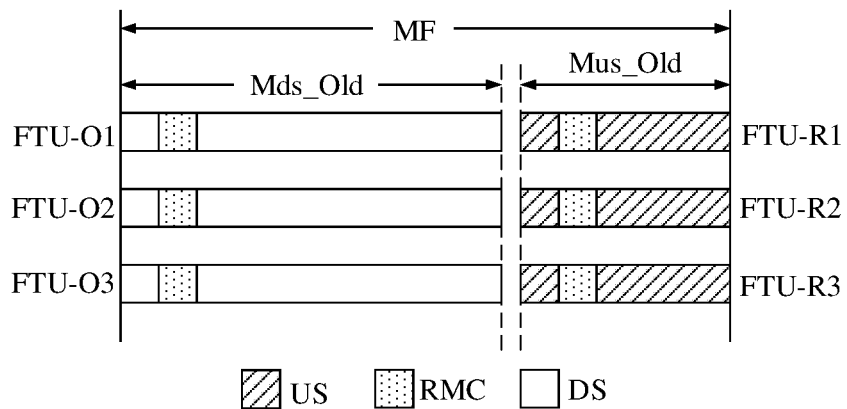
FIG. 6B-FIG. 6E are schematic diagrams of dynamic time adjustment according to an embodiment of the present invention.
Figure 6C:
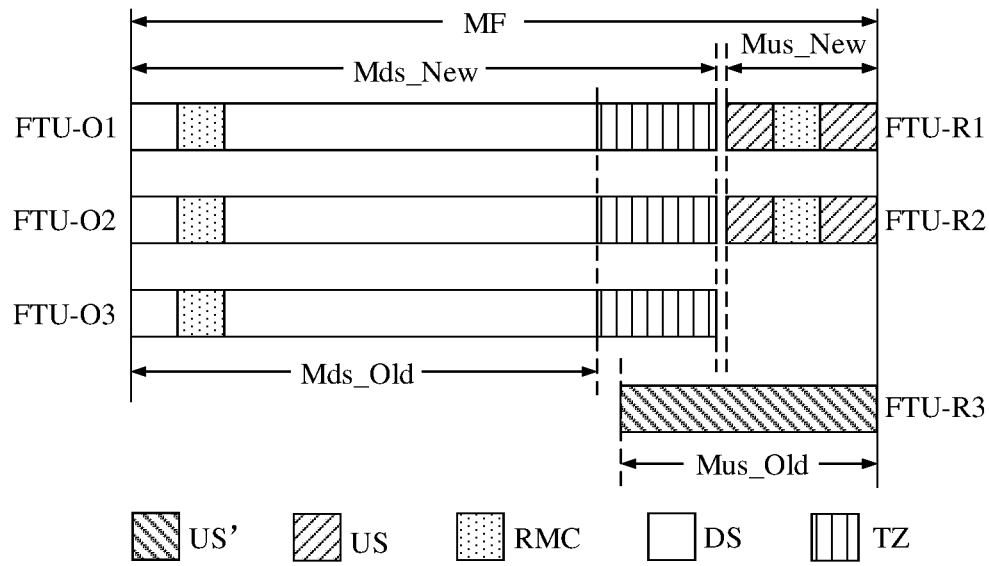
Figure 6D:
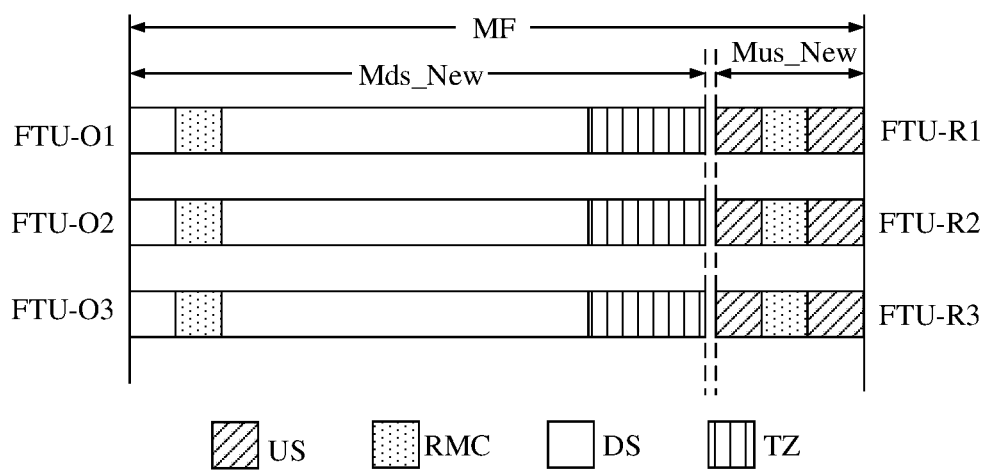
Figure 6E:
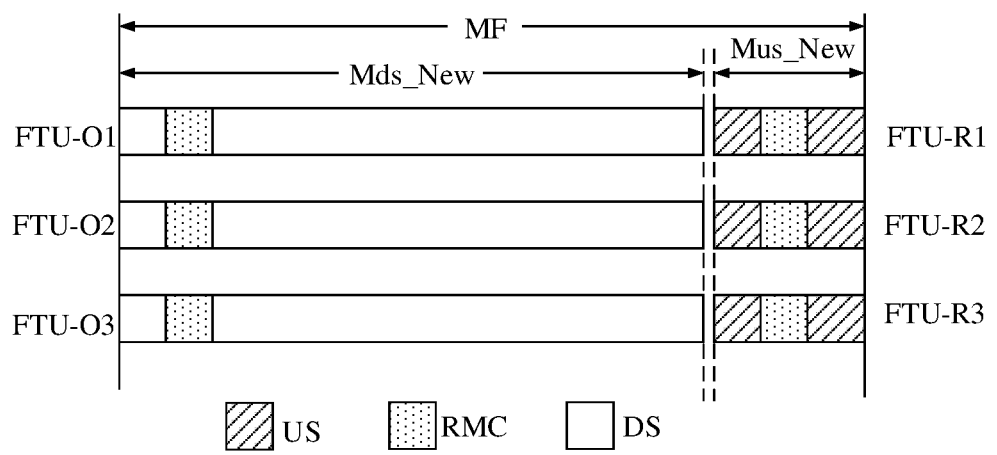

In this example shown in FIG. 6B to FIG. 6E, Mds_New is greater than Mds_Old, in other words, a length of a new downstream transmission duration (DS) is greater than a length of a currently used downstream transmission duration. As shown in FIG. 6B, before lengths of upstream and downstream transmission durations are adjusted, the length of the downstream transmission duration is Mds_Old and the length of the upstream transmission duration is Mus_Old. As shown in FIG. 6C, when the lengths of the upstream and downstream transmission durations are adjusted, the FTU-O 1, the FTU-O 2, the FTU-O 3, an FTU-R 1, and an FTU-R 2 adjust the lengths of the upstream and downstream transmission durations based on lengths of new upstream and downstream transmission durations. The FTU-R 3 does not receive a first indication message for adjusting the lengths of the upstream and downstream transmission durations, or is temporarily incapable of adjusting the lengths of the upstream and downstream transmission durations according to the first indication message. In this case, the FTU-R 3 does not adjust the lengths of the upstream and downstream transmission durations. After adjusting the lengths of the upstream and downstream transmission durations, the FTU-O 1, the FTU-O 2, and the FTU-O 3 keep silent, or send an idle symbol or another symbol with known content in the transition zone TZ, the FTU-R 1 and the FTU-R 2 send a data transmission phase symbol in the upstream transmission duration (a zone shown by US in FIG. 6C), but the FTU-R 3 does not adjust the lengths of the upstream and downstream transmission durations. Content sent by the FTU-R 3 is also different from that sent by the FTU-R 1 and the FTU-R 2. The FTU-R 3 does not send a data transmission phase symbol in the upstream transmission duration (a zone shown by US' in FIG. 6C), but keeps silent, or sends an idle symbol or another symbol with known content. As shown in FIG. 6D, when the FTU-R 3 receives the first indication message for adjusting the lengths of the upstream and downstream transmission durations, or is capable of adjusting the lengths of the upstream and downstream transmission durations according to the first indication message, the FTU-R 3 adjusts the lengths of the upstream and downstream transmission durations. In this case, the FTU-O 1, the FTU-O 2, and the FTU-O 3 still keep silent, or send the idle symbol or the another symbol with known content in the transition zone TZ. As shown in FIG. 6E, when the FTU-R 1, the FTU-R 2, and the FTU-R 3 all have adjusted the lengths of the upstream and downstream transmission durations, the FTU-R 1, FTU-R 2, and the FTU-R 3 send the data transmission phase symbol in the upstream transmission duration (a zone shown by US in FIG. 6E), and the FTU-O 1, the FTU-O 2, and the FTU-O 3 send a data transmission phase symbol in the downstream transmission duration (a zone shown by DS in FIG. 6E).

Figure 7:
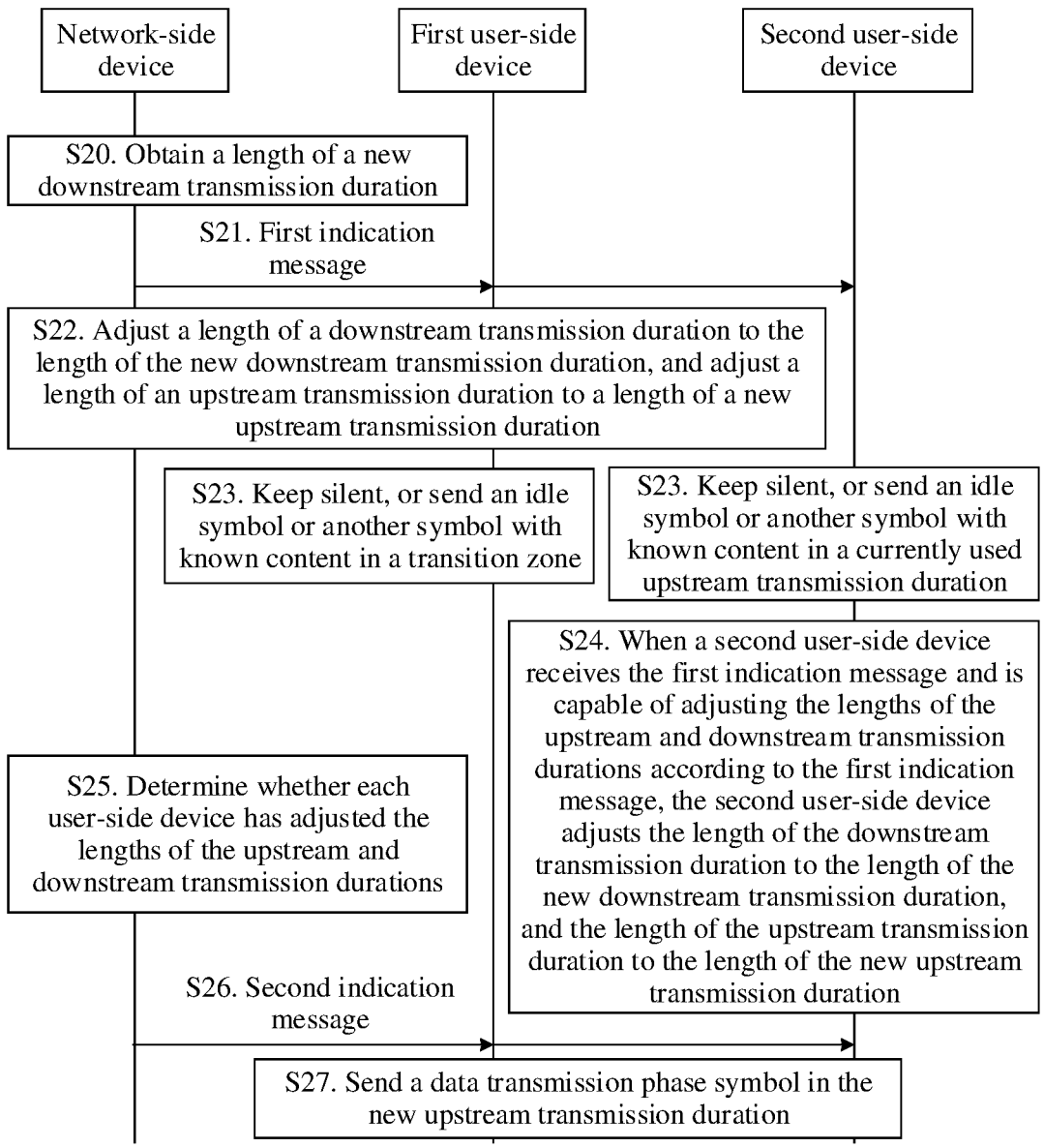
FIG. 7 is a flowchart of another dynamic time adjustment method according to an embodiment of the present invention.

FIG. 7 is a flowchart of a dynamic time adjustment method according to an embodiment of the present invention. A method procedure shown in FIG. 7 is basically the same as that in FIG. 6. A difference lies in that, in the method procedure shown in FIG. 7, a length of a new downstream transmission duration is less than a length of a currently used downstream transmission duration (in the method procedure shown in FIG. 6, the length of the new downstream transmission duration is greater than the length of the currently used downstream transmission duration). Referring to FIG. 7, the method includes the following steps.

Step S20: A network-side device obtains the length of the new downstream transmission duration.

For a specific process of step S20, refer to step S10.

Step S21: The network-side device sends a first indication message to a user-side device, where the first indication message is used to indicate the length of the new downstream transmission duration.

In this step, a format and a transmission manner of the first indication message are the same as those of the first indication message in step S11, and a difference lies only in that Mds_New or Mus_New indicated by the first indication message in this step meets the following condition: Mds_New is less than Mds_Old or Mus_New is greater than Mus_Old.

For a specific process of step S21, refer to step S11.

Step S22: The network-side device and a first user-side device adjust a length of a downstream transmission duration to the length of the new downstream transmission duration, and adjust a length of an upstream transmission duration to a length of a new upstream transmission duration.

A difference between step S22 and step S12 lies only in that the first user-side device does not adjust a position of an RMC symbol in step S22.

For other specific processes of step S22, refer to step S12.

It is easily learned that, in this embodiment of the present invention, the network-side device and the user-side device simultaneously perform step S22, for example, both perform after step S21.

Step S23: The first user-side device keeps silent, or sends an idle symbol or another symbol with known content in a transition zone, where the transition zone is from a last but Mus_Old+1 symbol to a last but Mus_New symbol of a TDD frame (herein, the last symbol of the TDD frame is an (MF-A)$^{th}$ symbol). A second user-side device keeps silent, or sends an idle symbol or another symbol with known content in a currently used upstream transmission duration.

It should be noted that, if an (MF-A−1)$^{th}$ symbol is the last symbol, the transition zone in step S23 may also be expressed as from a last but Mus_Old symbol to a last but Mus_New−1 symbol.

The transition zone is a transition zone of the new upstream transmission duration, and specifically is an additional zone of the new upstream transmission duration compared with the currently used upstream transmission duration.

For specific implementation of keeping silent, or sending an idle symbol or another symbol with known content, refer to step S13. Different from step S13, the first user-side device receives, by using a downstream RMC symbol, the first indication message sent by the network-side device. The first indication message may synchronously include Mds_New or Mus_New, TTR, and TA, which are TTRus and TAus in this embodiment. TTRus and TAus are used to indicate a zone in which the network-side device keeps silent in the new upstream transmission duration. The zone in which the network-side device keeps silent in the new upstream transmission duration includes the transition zone in the new upstream transmission duration. TRus and TAus may be determined according to the first indication message. The first user-side device makes configuration parameters TTRus and TAus take effect in an (N+3)$^{th}$ super frame. TTRus=Mus_Old−DRMCus, and TAus=Mus_New−Mus_Old.

Figure 7A:
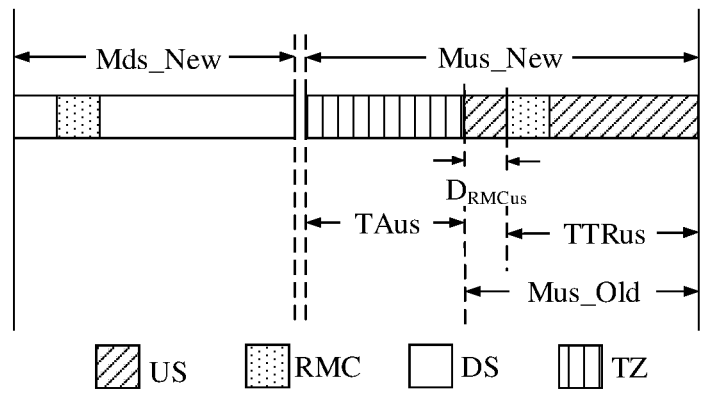
FIG. 7A is a schematic diagram of a frame format according to an embodiment of the present invention.

FIG. 7A is a schematic diagram of a TDD frame structure according to an embodiment of the present invention. TTRus=Mus_Old−DRMCus and TAus=Mus_New−Mus_Old. DRMCus indicates offset of an RMC symbol in the upstream transmission duration (in other words, a quantity of symbols between the RMC symbol and a start position of the currently used upstream transmission duration).

The network-side device sends a data transmission phase symbol in the downstream transmission duration, and the first user-side device sends a data transmission phase symbol in another zone of the upstream transmission duration different from the transition zone.

Step S24: When a second user-side device receives the first indication message and is capable of adjusting the lengths of the upstream and downstream transmission durations according to the first indication message, or when the second user-side device is capable of adjusting the lengths of the upstream and downstream transmission durations according to a previously received first indication message, the second user-side device adjusts the length of the downstream transmission duration to the length of the new downstream transmission duration, and the length of the upstream transmission duration to the length of the new upstream transmission duration.

When the second user-side device has adjusted the lengths of the upstream and downstream transmission durations, the second user-side device keeps silent or sends an idle symbol or another symbol with known content in the transition zone of the upstream transmission duration, and sends a data transmission phase symbol in another zone of the upstream transmission duration different from the transition zone.

In this step, the first user-side device continues to keep silent or send an idle symbol or another symbol with known content in the transition zone, and sends the data transmission phase symbol in another zone of the upstream transmission duration different from the transition zone.

Step S25: The network-side device determines whether each user-side device has adjusted the lengths of the upstream and downstream transmission durations.

The network-side device determines whether each user-side device has adjusted the length of the downstream transmission duration to the length of the new downstream transmission duration, and adjusted the length of the upstream transmission duration to the length of the new upstream transmission duration.

In one implementation of this embodiment of the present invention, the network-side device determines, by receiving an acknowledgment (ACK) message returned by the user-side device, that the user-side device has adjusted the lengths of the upstream and downstream transmission durations. Specifically, after adjusting the lengths of the upstream and downstream transmission durations, the user-side device sends an acknowledgment message to the network-side device. The acknowledgment message is used to indicate that the user-side device has adjusted the lengths of the upstream and downstream transmission durations. After receiving the acknowledgment message sent by the user-side device, the network-side device determines that the user-side device has adjusted the lengths of the upstream and downstream transmission durations.

The user-side device may send the acknowledgment message to the network-side device in an upstream RMC symbol (not in the transition zone).

In another implementation of this embodiment of the present invention, the network-side device may further determine, based on the symbol sent by the user-side device, whether the user-side device has adjusted the lengths of the upstream and downstream transmission durations. If the user-side device sends the data transmission phase symbol in the upstream transmission duration, the user-side device has adjusted the lengths of the upstream and downstream transmission durations. If the user-side device keeps silent, or sends an idle symbol or another symbol with known content in the upstream transmission duration, the user-side device has not adjusted the lengths of the upstream and downstream transmission durations. Specifically, the network-side device may determine based on an upstream symbol sent by the user-side device in last Mus_Old symbols of a TDD frame.

Step S26: The network-side device sends a second indication message to the user-side device, where the second indication message is used to indicate that all user-side devices have adjusted the lengths of the upstream and downstream transmission durations.

In this step, the network-side device may send the second indication message (cDTA req Type2) in a downstream RMC symbol or on an EOC.

The second indication message may include DTAFDC. A value of DTAFDC gradually decreases (1 is subtracted from each transmission frame) until the value changes to 0.

Correspondingly, the user-side device receives the second indication message sent by the network-side device in step S26.

Step S27: The user-side device sends a data transmission phase symbol in the new upstream transmission duration.

In this step, after determining that each user-side device has adjusted the lengths of the upstream and downstream transmission durations, the user-side device may send the data transmission phase symbol in the transition zone. Therefore, the user-side device sends the data transmission phase symbol in the new upstream transmission duration.

Specifically, the user-side device may immediately send the data transmission phase symbol in the transition zone after receiving the second indication message. Alternatively, the user-side device may send the data transmission phase symbol in the transition zone after the value of DTAFDC in the second indication message changes to 0.

Further, in addition to indicating that all user-side devices have adjusted the lengths of the upstream and downstream transmission durations, the second indication message may be used to indicate whether the user-side device adjusts a position of the RMC symbol in the upstream transmission duration.

Specifically, in one implementation, when receiving the second indication message, the user-side device adjusts the position of the RMC symbol in the upstream transmission duration, to be specific, moves the RMC symbol forward by Mds_New-Mds_Old symbols. Adjusting the position of the RMC symbol by the user-side device in the upstream transmission duration may be performed with step S27 at the same time.

Specifically, after receiving the second indication message, the user-side device may immediately adjust the position of the RMC symbol in the upstream transmission duration. Alternatively, the user-side device may adjust the position of the RMC symbol in the upstream transmission duration when the value of DTAFDC in the second indication message changes to 0. Generally, the position of the RMC symbol in the upstream transmission duration is adjusted when the value of DTAFDC changes to 0, ensuring high reliability. If the user-side device adjusts the position of the RMC symbol immediately after receiving the second indication message, this case very likely occurs: The network-side device considers that the user-side device receives the second indication message and adjusts the position of the RMC symbol, but the user-side device actually does not receive the second indication message (for example, due to noise, the message is damaged and the message content is not received). Therefore, the user-side device does not adjust the position of the RMC symbol and parameters for transmit and receive ends of a next frame are not aligned. However, in a manner in which the value of DTAFDC changes to 0, as long as the user-side device correctly receives the second indication message for several times, the user-side device may determine a time for adjusting the position of the RMC symbol, and does not need to correctly receive the second indication message each time.

In another implementation, when receiving the second indication message, the user-side device may not adjust the position of the RMC symbol in the upstream transmission duration.

In the current G.fast standard, a distance between the upstream RMC symbol and the start position of the upstream transmission duration is fixed. Therefore, after the lengths of the upstream and downstream transmission durations are adjusted, the position of the upstream RMC symbol needs to be adjusted. The first implementation is usually used.

However, processing is simpler without adjusting the position of the RMC symbol in the upstream transmission duration. Therefore, in this embodiment of the present invention, the position of the RMC symbol in the upstream transmission duration may alternatively not be adjusted. The reasons are as follows: A bit bearer table used by the RMC symbol is different from that used by another symbol. If the position of the upstream RMC symbol changes, the user-side device needs to adjust a time for switching the bit bearer table (switching refers to switching from a bit bearer table of another symbol to that of an RMC symbol) when sending the upstream symbol. For example, the position of the upstream RMC symbol changes from the twelfth symbol to the fifth symbol. In this case, the user-side device originally switches a bit bearer table of a normal symbol to that of the RMC symbol starting from the twelfth symbol. After adjustment, the user-side device needs to switch the bit bearer table of the normal symbol to that of the RMC symbol starting from the fifth symbol. Processing is inconvenient. On the contrary, this problem does not occur if the position of the RMC symbol is not changed.

Further, the dynamic time adjustment process in steps S20 to S27 may require many TDD frames, which may include a sync frame. If a sync frame is required in the dynamic time adjustment process, the method may include:

The first user-side device sends the sync symbol in the first symbol in the currently used upstream transmission duration or in the first symbol in the new upstream transmission duration. In other words, the first user-side device sends the sync symbol in the first symbol after the transition zone in the new upstream transmission duration, or in the first symbol of the transition zone in the new upstream transmission duration.

The second user-side device sends or does not send the sync symbol in the first symbol in the currently used upstream transmission duration.

The first indication message may indicate whether the first user-side device sends the sync symbol in the first symbol in the currently used upstream transmission duration or in the first symbol in the new upstream transmission duration.

As described above, the sync symbol is used to train a canceller coefficient. The canceller coefficient can be trained as long as positions of sync symbols sent by all first user-side devices are aligned. Therefore, the first user-side device may send the sync symbol in the first symbol of the currently used upstream transmission duration or in the first symbol of the new upstream transmission duration.

The following further describes the method provided in this embodiment of the present invention by using FIG. 7B to FIG. 7E as an example. In this example, three signals correspond to three transceivers (FTU-O 1 to FTU-O 3) of the network-side device. In practice, there may be more or less signals (at least two signals).

Figure 7B:
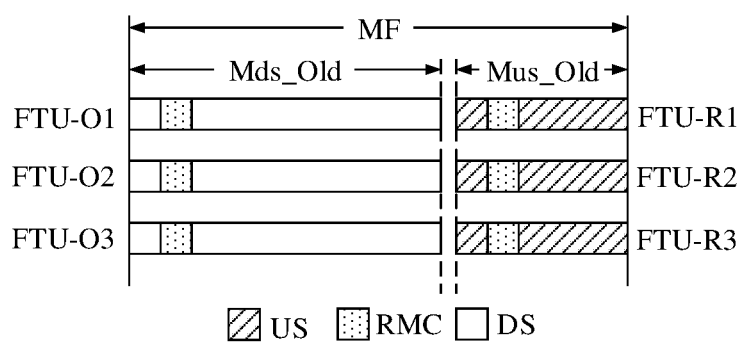
FIG. 7B-FIG. 7E are schematic diagrams of dynamic time adjustment according to an embodiment of the present invention.
Figure 7C:
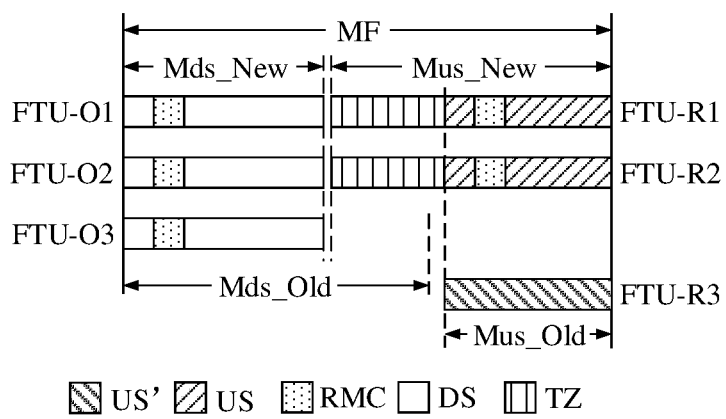
Figure 7D:
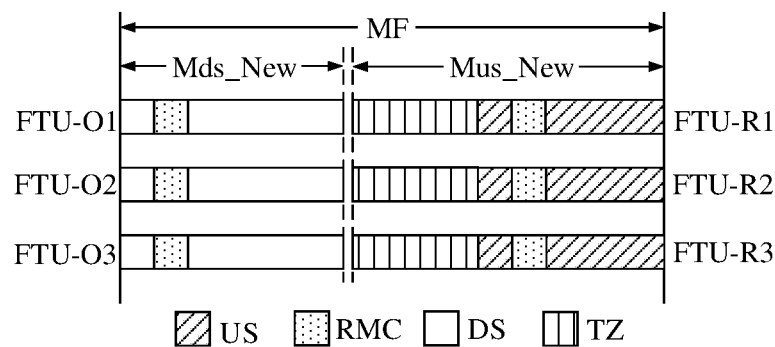
Figure 7E:
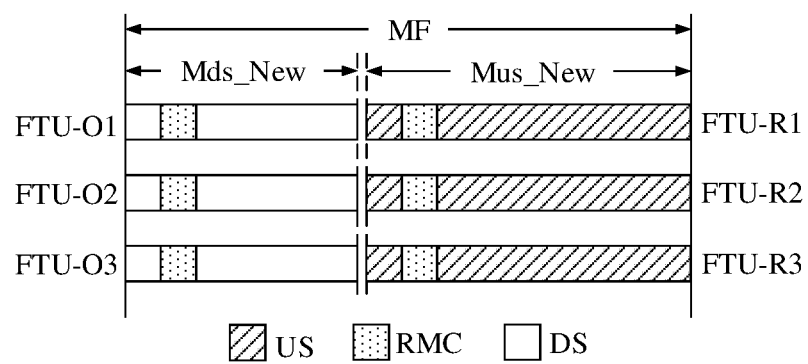

In this example shown in FIG. 7B to FIG. 7E, Mds_New is less than Mds_Old, in other words, a length of a new downstream transmission duration (DS) is less than a length of a currently used downstream transmission duration. As shown in FIG. 7B, before lengths of upstream and downstream transmission durations are adjusted, a length of a downstream transmission duration is Mds_Old, and a length of an upstream transmission duration is Mus_Old. As shown in FIG. 7C, when the lengths of the upstream and downstream transmission durations are adjusted, the FTU-O 1, the FTU-O 2, the FTU-O 3, an FTU-R 1, and an FTU-R 2 adjust the lengths of the upstream and downstream transmission durations based on lengths of new upstream and downstream transmission durations. The FTU-R 3 does not receive a first indication message for adjusting the lengths of the upstream and downstream transmission durations, or is temporarily incapable of adjusting the lengths of the upstream and downstream transmission durations according to the first indication message. In this case, the FTU-R 3 does not adjust the lengths of the upstream and downstream transmission durations. After adjusting the upstream and downstream transmission durations, the FTU-R 1 and the FTU-R 2 keep silent, or send an idle symbol or another symbol with known content in the transition zone TZ, the FTU-R 1 and the FTU-R 2 send a data transmission phase symbol in a zone (a zone shown by US in FIG. 7C) other than the transition zone TZ in the upstream transmission duration, but the FTU-R 3 does not adjust the lengths of the upstream and downstream transmission durations. Content sent by the FTU-R 3 is also different from that sent by the FTU-R 1 and the FTU-R 2. The FTU-R 3 keeps silent, or sends an idle symbol or another symbol with known content in the entire upstream transmission duration (a zone shown by US' in FIG. 7C). As shown in FIG. 7D, when the FTU-R 3 receives the indication message for adjusting the lengths of the upstream and downstream transmission durations, or is capable of adjusting the lengths of the upstream and downstream transmission durations according to the first indication message, the FTU-R 3 adjusts the lengths of the upstream and downstream transmission durations. In this case, the FTU-R 1, the FTU-R 2, and the FTU-R 3 all keep silent, or send an idle symbol or another symbol with known content in the transition zone TZ. As shown in FIG. 7E, when the FTU-R 1, the FTU-R 2, and the FTU-R 3 all have adjusted the lengths of the upstream and downstream transmission durations and receive a second indication message, the FTU-R 1, the FTU-R 2, and the FTU-R 3 send a data transmission phase symbol in the upstream transmission duration (a zone shown by US in FIG. 7E).

Figure 8:
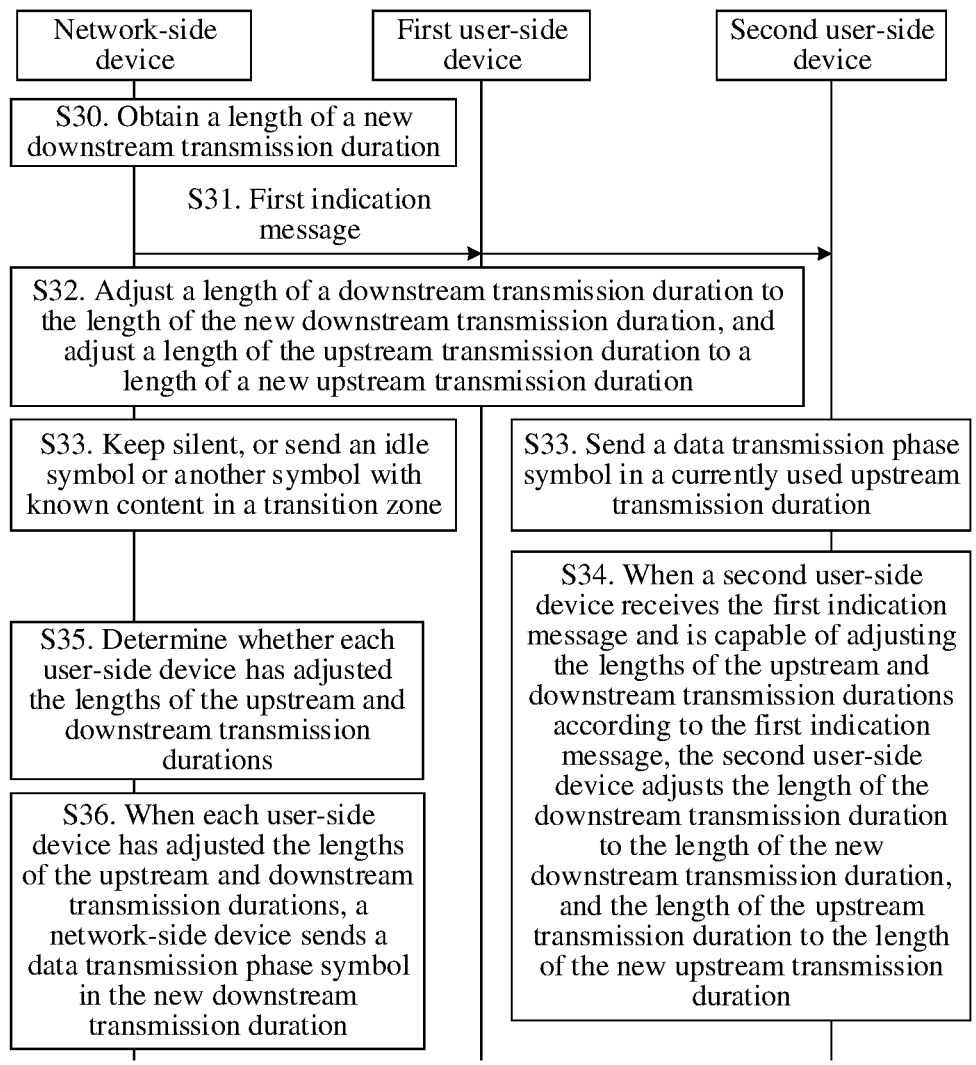
FIG. 8 is a flowchart of another dynamic time adjustment method according to an embodiment of the present invention.

FIG. 8 is a flowchart of a dynamic time adjustment method according to an embodiment of the present invention. A method procedure shown in FIG. 8 is basically the same as that in FIG. 6. A difference lies in that, in the method procedure shown in FIG. 8, a second user-side device sends a data transmission phase symbol in an upstream transmission duration (in the method procedure provided in FIG. 6, the second user-side device keeps silent, or sends an idle symbol or another symbol with known content in the upstream transmission duration). Referring to FIG. 8, the method includes the following steps.

Step S30: A network-side device obtains a length of a new downstream transmission duration.

For a specific process of step S30, refer to step S10.

Step S31: The network-side device sends a first indication message to a user-side device, where the first indication message is used to indicate the length of the new downstream transmission duration.

For a specific process of step S31, refer to step S11.

Step S32: The network-side device and a first user-side device adjust a length of a downstream transmission duration to the length of the new downstream transmission duration, and adjust a length of the upstream transmission duration to a length of a new upstream transmission duration.

For a specific process of step S32, refer to step S12.

Step S33: The network-side device keeps silent, or sends an idle symbol or another symbol with known content in a transition zone, where the transition zone is from an (Mds_Old+1)$^{th}$ symbol to an (Mds_New)$^{th}$ symbol (herein, a 1$^{st}$ symbol is the first symbol, and if a 0$^{th}$ symbol is the first symbol, the transition zone is from an (Mds_Old)$^{th}$ symbol to an (Mds_New−1)$^{th}$ symbol). The second user-side device sends the data transmission phase symbol in a currently used upstream transmission duration.

For actions performed by the network-side device, refer to detailed description of step S13.

The network-side device sends a data transmission phase symbol in another zone of the downstream transmission duration different from the transition zone, and the first user-side device sends a data transmission phase symbol in the currently used upstream transmission duration.

Step S34: When the second user-side device receives the first indication message and is capable of adjusting the lengths of the upstream and downstream transmission durations according to the first indication message, or when the second user-side device is capable of adjusting the lengths of the upstream and downstream transmission durations according to a previously received first indication message, the second user-side device adjusts the length of the downstream transmission duration to the length of the new downstream transmission duration, and the length of the upstream transmission duration to the length of the new upstream transmission duration.

For a specific process of step S34, refer to step S14.

Step S35: The network-side device determines whether each user-side device has adjusted the lengths of the upstream and downstream transmission durations.

In this embodiment of the present invention, the second user-side device sends the data transmission phase symbol in the currently used upstream transmission duration. Therefore, the network-side device cannot determine, based on the symbol sent by the user-side device, whether the user-side device has adjusted the lengths of the upstream and downstream transmission durations. The network-side device can determine, only by detecting a position of an RMC symbol in the upstream transmission duration, whether the user-side device has adjusted the lengths of the upstream and downstream transmission durations. For a specific process, refer to step S15.

Step S36: When each user-side device has adjusted the lengths of the upstream and downstream transmission durations, the network-side device sends a data transmission phase symbol in the new downstream transmission duration.

For a specific process of step S36, refer to step S16.

Further, the dynamic time adjustment process in steps S30 to S36 may require many TDD frames, which may include a sync frame. If a sync frame is required in the dynamic time adjustment process, the method may include the following.

The first user-side device sends the sync symbol in the first symbol in the new upstream transmission duration.

The second user-side device sends or does not send the sync symbol in the first symbol in the currently used upstream transmission duration.

Figure 8A:
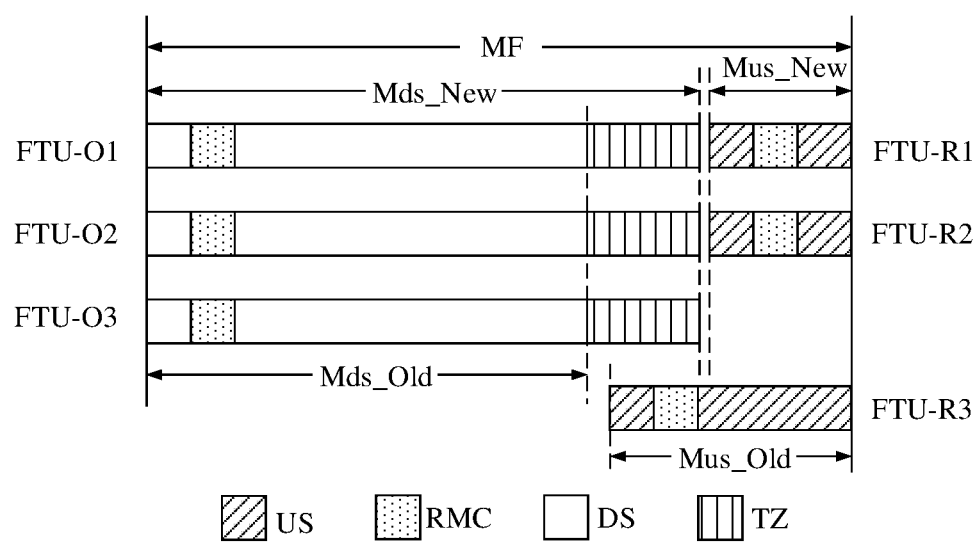
FIG. 8A is a schematic diagram of dynamic time adjustment according to an embodiment of the present invention.

The following further describes the method provided in this embodiment of the present invention by using FIG. 8A as an example. In this example, three signals correspond to three transceivers (FTU-O 1 to FTU-O 3) of the network-side device. In practice, there may be more or less signals (at least two signals). Refer to FIG. 6B, FIG. 6D, FIG. 6E, and FIG. 8A that is used to replace FIG. 6C.

In this example shown in FIG. 8A, Mds_New is greater than Mds_Old, in other words, a length of a new downstream transmission duration (DS) is greater than a length of a currently used downstream transmission duration. As shown in FIG. 6B, before lengths of upstream and downstream transmission durations are adjusted, the length of the downstream transmission duration is Mds_Old and the length of the upstream transmission duration is Mus_Old. As shown in FIG. 8A, when the lengths of the upstream and downstream transmission durations are adjusted, the FTU-O 1, the FTU-O 2, the FTU-O 3, an FTU-R 1, and an FTU-R 2 adjust the lengths of the upstream and downstream transmission durations based on lengths of new upstream and downstream transmission durations. The FTU-R 3 does not receive a first indication message for adjusting the lengths of the upstream and downstream transmission durations, or is temporarily incapable of adjusting the lengths of the upstream and downstream transmission durations according to the first indication message. In this case, the FTU-R 3 does not adjust the lengths of the upstream and downstream transmission durations. A difference between FIG. 8A and FIG. 6C lies in that the FTU-R 3 sends a data transmission phase symbol in the upstream transmission duration. As shown in FIG. 6D, when the FTU-R 3 receives the first indication message for adjusting the lengths of the upstream and downstream transmission durations, or is capable of adjusting the lengths of the upstream and downstream transmission durations according to the first indication message, the FTU-R 3 adjusts the lengths of the upstream and downstream transmission durations. In this case, the FTU-O 1, the FTU-O 2, and the FTU-O 3 still keep silent, or send an idle symbol or another symbol with known content in a transition zone TZ. As shown in FIG. 6E, when the FTU-R 1, the FTU-R 2, and the FTU-R 3 all have adjusted the lengths of the upstream and downstream transmission durations, the FTU-R 1, FTU-R 2, and the FTU-R 3 send the data transmission phase symbol in the upstream transmission duration (a zone shown by US in FIG. 6E), and the FTU-O 1, the FTU-O 2, and the FTU-O send a data transmission phase symbol in the downstream transmission duration (a zone shown by DS in FIG. 6E).

Figure 9:
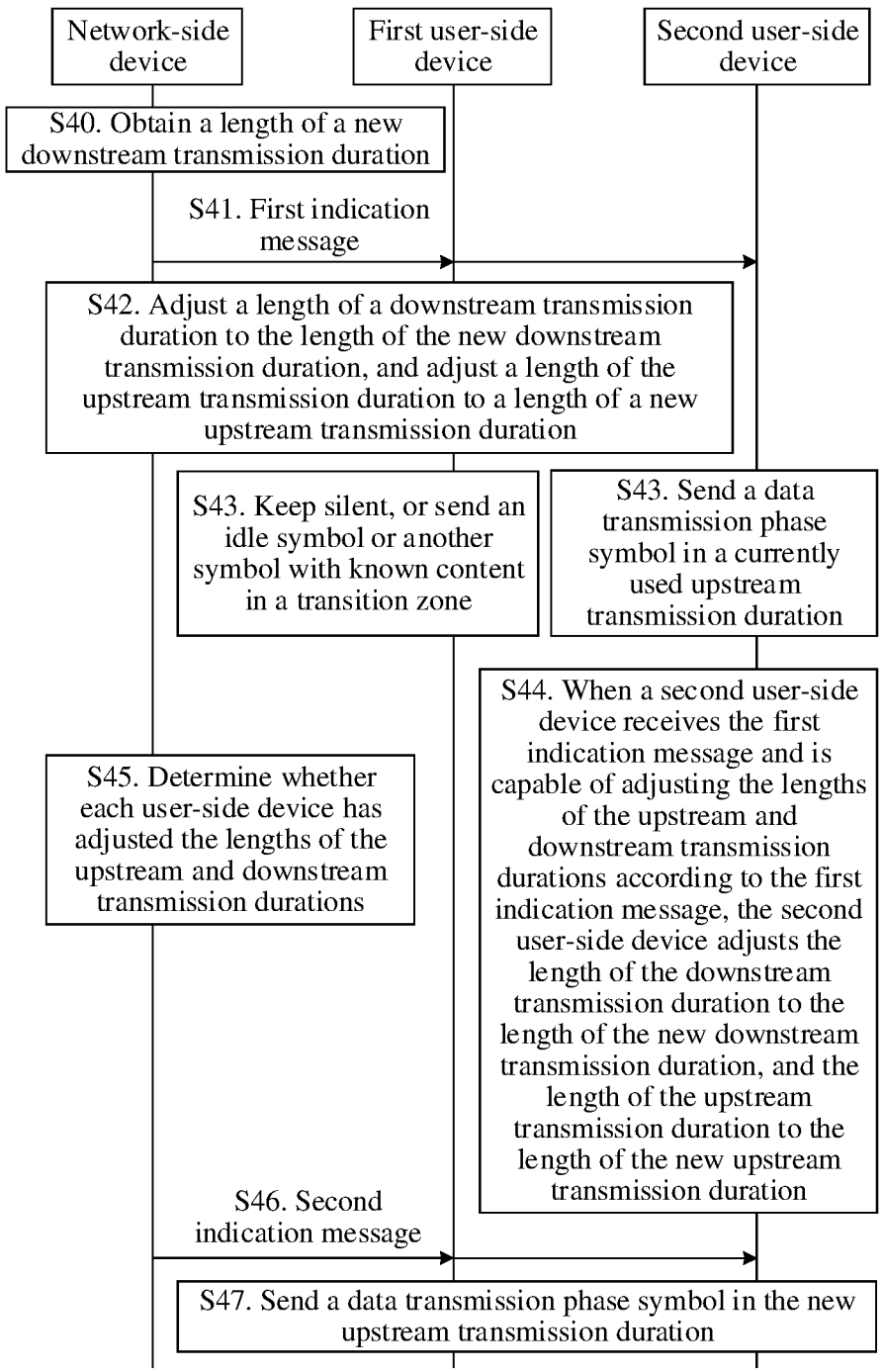
FIG. 9 is a flowchart of another dynamic time adjustment method according to an embodiment of the present invention.

FIG. 9 is a flowchart of a dynamic time adjustment method according to an embodiment of the present invention. A method procedure shown in FIG. 9 is basically the same as that in FIG. 7. A difference lies in that, in the method procedure shown in FIG. 9, a second user-side device sends a data transmission phase symbol in an upstream transmission duration (in the method procedure provided in FIG. 7, the second user-side device keeps silent, or sends an idle symbol or another symbol with known content in the upstream transmission duration). Referring to FIG. 9, the method includes the following steps.

Step S40: A network-side device obtains a length of a new downstream transmission duration.

For a specific process of step S40, refer to step S20.

Step S41: The network-side device sends a first indication message to a user-side device, where the first indication message is used to indicate the length of the new downstream transmission duration.

For a specific process of step S41, refer to step S21.

Step S42: The network-side device and a first user-side device adjust a length of a downstream transmission duration to the length of the new downstream transmission duration, and adjust a length of the upstream transmission duration to a length of a new upstream transmission duration.

For other specific processes of step S42, refer to step S22.

Step S43: The first user-side device keeps silent, or sends an idle symbol or another symbol with known content in a transition zone, where the transition zone is from a last but Mus_Old+1 symbol to a last but Mus_New symbol of a TDD frame (herein, the last symbol of the TDD frame is an (MF-A)$^{th}$ symbol). The second user-side device sends the data transmission phase symbol in a currently used upstream transmission duration.

For specific implementation of keeping silent, or sending an idle symbol or another symbol with known content, refer to step S23.

The network-side device sends a data transmission phase symbol in the downstream transmission duration, and the first user-side device sends a data transmission phase symbol in another zone of the upstream transmission duration different from the transition zone.

Step S44: When the second user-side device becomes a first user-side device, the first user-side device adjusts the length of the downstream transmission duration to the length of the new downstream transmission duration, and adjusts the length of the upstream transmission duration to the length of the new upstream transmission duration.

For a specific process of step S44, refer to step S24.

Step S45: The network-side device determines whether each user-side device has adjusted the lengths of the upstream and downstream transmission durations.

In this embodiment of the present invention, the second user-side device sends the data transmission phase symbol in the currently used upstream transmission duration. Therefore, the network-side device cannot determine, based on the symbol sent by the user-side device, whether the user-side device has adjusted the lengths of the upstream and downstream transmission durations. The network-side device can determine, only by receiving an acknowledgment (ACK) message returned by the user-side device, that the user-side device has adjusted the lengths of the upstream and downstream transmission durations. For a specific process, refer to step S25.

Step S46: The network-side device sends a second indication message to the user-side device, where the second indication message is used to indicate that at least two user-side devices have adjusted the lengths of the upstream and downstream transmission durations.

For a specific process of step S46, refer to step S26.

Step S47: The user-side device sends a data transmission phase symbol in the new upstream transmission duration.

For a specific process of step S47, refer to step S27.

Further, the dynamic time adjustment process in steps S40 to S47 may require many TDD frames, which may include a sync frame. If a sync frame is required in the dynamic time adjustment process, the method may include:

The first user-side device sends the sync symbol in the first symbol in the currently used upstream transmission duration or in the first symbol in the new upstream transmission duration.

The second user-side device sends or does not send the sync symbol in the first symbol in the currently used upstream transmission duration.

The first indication message may indicate whether the first user-side device sends the sync symbol in the first symbol in the currently used upstream transmission duration or in the first symbol in the new upstream transmission duration.

Figure 9A:
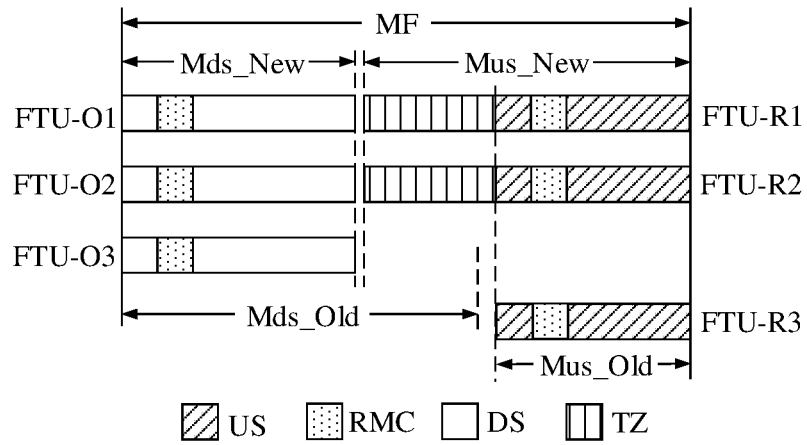
FIG. 9A is a schematic diagram of dynamic time adjustment according to an embodiment of the present invention.

The following further describes the method provided in this embodiment of the present invention by using FIG. 9A as an example. In this example, three signals correspond to three transceivers (FTU-O 1 to FTU-O 3) of the network-side device. In practice, there may be more or less signals (at least two signals). Refer to FIG. 7B, FIG. 7D, FIG. 7E, and FIG. 9A that is used to replace FIG. 7C.

In this example shown in FIG. 9A, Mds_New is less than Mds_Old, in other words, a length of a new downstream transmission duration (DS) is less than a length of a currently used downstream transmission duration. As shown in FIG. 7B, before lengths of upstream and downstream transmission durations are adjusted, a length of a downstream transmission duration is Mds_Old, and a length of an upstream transmission duration is Mus_Old. As shown in FIG. 9A, when the lengths of the upstream and downstream transmission durations are adjusted, the FTU-O 1, the FTU-O 2, the FTU-O 3, an FTU-R 1, and an FTU-R2 adjust the lengths of the upstream and downstream transmission durations based on lengths of new upstream and downstream transmission durations. The FTU-R 3 does not receive a first indication message for adjusting the lengths of the upstream and downstream transmission durations, or is temporarily incapable of adjusting the lengths of the upstream and downstream transmission durations according to the first indication message. In this case, the FTU-R 3 does not adjust the lengths of the upstream and downstream transmission durations. A difference between FIG. 9A and FIG. 7C lies in that the FTU-R 3 sends a data transmission phase symbol in the upstream transmission duration. As shown in FIG. 7D, when the FTU-R 3 receives the indication message for adjusting the lengths of the upstream and downstream transmission durations, or is capable of adjusting the lengths of the upstream and downstream transmission durations according to the first indication message, the FTU-R 3 adjusts the lengths of the upstream and downstream transmission durations. In this case, the FTU-R 1, the FTU-R 2, and the FTU-R 3 all keep silent, or send an idle symbol or another symbol with known content in the transition zone TZ. As shown in FIG. 7E, when the FTU-R 1, the FTU-R 2, and the FTU-R 3 all have adjusted the lengths of the upstream and downstream transmission durations and receive a second indication message, the FTU-R 1, the FTU-R 2, and the FTU-R 3 send a data transmission phase symbol in the upstream transmission duration (a zone shown by US in FIG. 7E).

Figure 10:
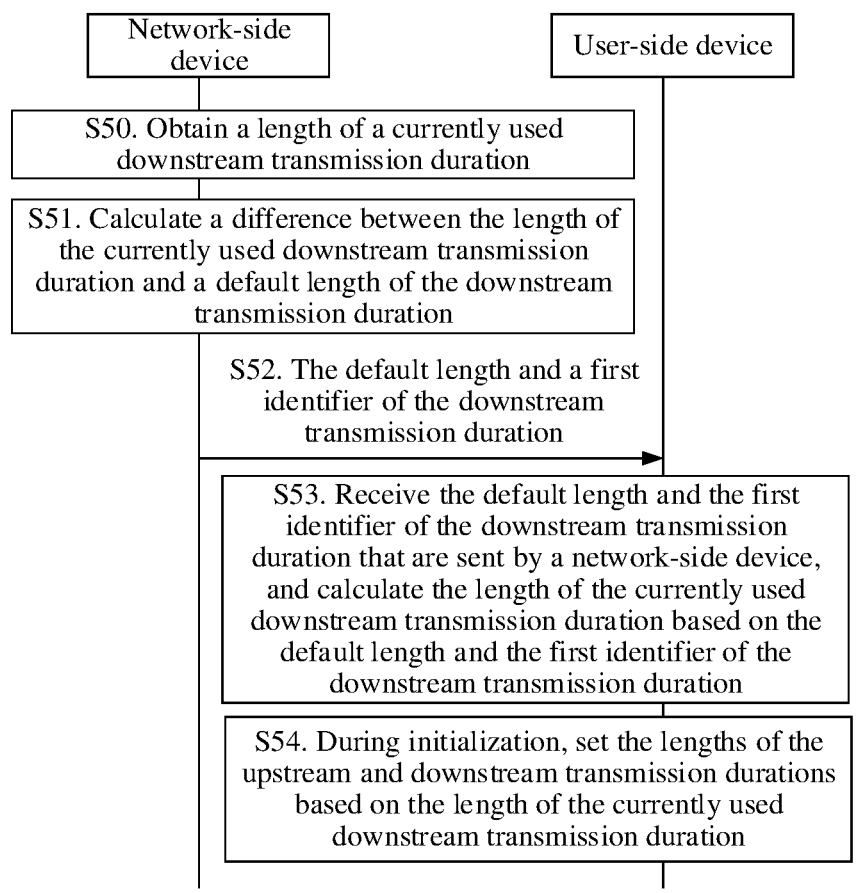
FIG. 10 is a flowchart of another dynamic time adjustment method according to an embodiment of the present invention.

FIG. 10 is a flowchart of a dynamic time adjustment method according to an embodiment of the present invention. A method procedure shown in FIG. 10 may be completed based on any one of the method procedures in FIG. 6 to FIG. 9. Before the method procedure shown in FIG. 10 is described, the following first briefly describes a problem to be resolved by using the method procedure shown in FIG. 10.

In the G.fast standard, when a line goes online, interaction between a network-side device and a user-side device corresponding to the line includes three phases: handshake, initialization, and data transmission (showtime). During handshake, the network-side device usually sends default Mds_hs of Mds to the user-side device, so that the user-side device uses Mds_hs to determine lengths of upstream and downstream transmission durations during initialization. If some of the lines connected to the network-side device enter the showtime and are updated by Mds, Mds used by a current system is Mds_current. If Mds_current is not equal to Mds_hs, when some lines connected to the network-side device need to go online, these lines need to pass through handshake and initialization before entering the showtime. Mds used by these lines is Mds_hs during handshake and initialization. In this case, Mds used by some lines is Mds_current, and Mds used by some lines is Mds_hs. As a result, a near-end crosstalk occurs. To resolve this problem, another line go-online solution is to update Mds of all lines during showtime from Mds_current to Mds_hs by using an Mds update process when a line is going online. After the line goes online, Mds of all the lines during showtime is updated to Mds_current by using the Mds update process. However, in this update manner, Mds needs to be updated twice for the lines during showtime (A first update is from Mds_current to Mds_hs, and a second update is from Mds_hs to Mds_current). User experience is relatively poor for users using the lines during showtime.

To resolve this problem, this embodiment of the present invention provides the method procedure shown in FIG. 10. Referring to FIG. 10, the method includes the following steps.

Step S50: When the network-side device receives an online request from the user-side device, the network-side device obtains a length of a currently used downstream transmission duration.

Going online refers to activating a line between the network-side device and the user-side device, so that the line can transmit and receive data.

The user-side device in step S50 may be the user-side device shown in any one of FIG. 6 to FIG. 9. In this case, the method procedure shown in FIG. 10 is executed before the method procedure shown in any one of FIG. 6 to FIG. 9. Alternatively, the user-side device in step S50 may be a user-side device other than the user-side device shown in any one of FIG. 6 to FIG. 9. In this case, the method procedure shown in FIG. 10 may be executed before or after the method procedure shown in any one of FIG. 6 to FIG. 9.

Step S51: The network-side device calculates a difference between the length of the currently used downstream transmission duration and a default length of the downstream transmission duration.

The default length of the downstream transmission duration is an initial parameter. Each user-side device uses the initial parameter to set the lengths of the upstream and downstream transmission durations when going online. However, in a dynamic adjustment process, the lengths of the upstream and downstream transmission durations change, and therefore each user-side device cannot use the default length of the downstream transmission duration to directly go online.

Step S52: The network-side device sends the default length and a first identifier of the downstream transmission duration to the user-side device during handshake, where the first identifier is used to indicate a value of the difference.

Specifically, the network-side device sends the default length Mds_hs and the first identifier of the downstream transmission duration to the user-side device by using a handshake message.

In one implementation of this embodiment of the present invention, the first identifier may be defined using an offset. Offset=Mds_current−Mds_hs. To be specific, if Mds_current is greater than Mds_hs, the offset is a positive number. If Mds_current is less than Mds_hs, the offset is a negative number. Mds_current is the length of the currently used downstream transmission duration.

In another implementation of this embodiment of the present invention, the first identifier may alternatively be defined using another parameter, for example, m and n. Offset=m×4+n and Offset=Mds_current−Mds_hs. In this case, the network-side device needs to send only Mds_hs, m, and n. The offset may be replaced by m and n, to reduce a quantity of bits in the first identifier and reduce resources. For example, a length of the offset may be a 5-bit binary number. Only four bits may be required when m and n are used. It should be noted that 4 in the foregoing formula is merely an example, and may alternatively be replaced by a number greater than 4 or less than 4. Using a number greater than 4 can further reduce the quantity of bits in the first identifier.

Step S53: The user-side device receives the default length and the first identifier of the downstream transmission duration that are sent by the network-side device, and calculates the length of the currently used downstream transmission duration based on the default length and the first identifier of the downstream transmission duration.

Step S54: During initialization, the user-side device sets the lengths of the upstream and downstream transmission durations based on the length of the currently used downstream transmission duration.

After receiving the offset and Mds_hs, the user-side device calculates Mds_current=Mds_hs+offset, and sets a downstream receiving duration to Mds_current and an upstream sending duration to MF-Mds_current-A during initialization. Such setting continues until Mds is updated during showtime. Therefore, Mds_current in this embodiment of the present invention may be Mds_Old described above.

After the setting, upstream and downstream transmission zones can be configured based on Mds_current for a newly online line during handshake and initialization. This effectively avoids frequently updating Mds of the lines during showtime. In addition, the network-side device cannot start updating Mds when a line goes online. In other words, the network-side device cannot simultaneously perform the method procedure shown in any one of FIG. 6 to FIG. 9 when performing steps S50 to S54. In other words, when receiving the online request sent by the user-side device, the network-side device does not adjust the lengths of the upstream and downstream transmission durations.

Figure 11:
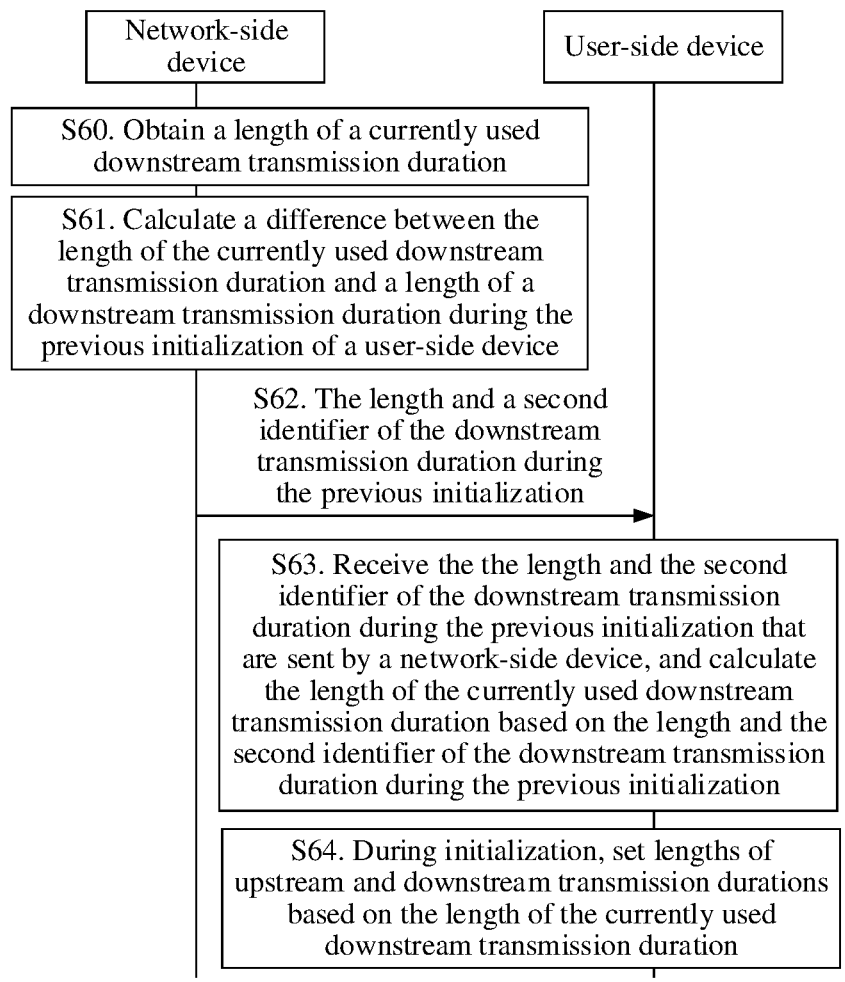
FIG. 11 is a flowchart of another dynamic time adjustment method according to an embodiment of the present invention.

FIG. 11 is a flowchart of a dynamic time adjustment method according to an embodiment of the present invention. A method procedure shown in FIG. 11 may be completed based on any one of the method procedures in FIG. 6 to FIG. 9. Before the method procedure shown in FIG. 11 is described, the following first briefly describes a problem to be resolved by using the method procedure shown in FIG. 11.

In the G.fast standard, a line may go offline due to certain reasons. If the line goes offline, it exits showtime. If the line goes online again, it usually needs to go through handshake and initialization. The standard defines a mode referred to as fast retrain (Fast retrain). Through fast retrain, a network-side device and a user-side device can enable the line, after exiting showtime, to directly enter initialization without going through handshake. In this case, Mds used during initialization is a parameter used during previous initialization, and is denoted as Mds_ini. Current Mds is denoted as Mds_current for the network-side device. If Mds_current is not equal to Mds_ini and some lines connected to the network-side device require Fast retrain, some lines use Mds_current and some lines use Mds_ini. Therefore, a near-end crosstalk occurs.

Therefore, this embodiment of the present invention provides the method procedure shown in FIG. 11 to resolve this problem. Referring to FIG. 11, the method includes the following steps.

Step S60: When the network-side device receives a fast retrain request from the user-side device, the network-side device obtains a length of a currently used downstream transmission duration.

Step S61: The network-side device calculates a difference between the length of the currently used downstream transmission duration and a length of a downstream transmission duration during the previous initialization of the user-side device.

Step S62: The network-side device sends the length and a second identifier of the downstream transmission duration during the previous initialization to the corresponding user-side device, where the second identifier is used to indicate a value of the difference.

Specifically, the network-side device sends the length Mds_ini and the second identifier of the downstream transmission duration during the previous initialization to the user-side device by using a Fast retrain message (the Fast retrain message herein may be continuously updated during showtime).

After the user-side device enters showtime from the previous initialization, the length of the downstream transmission duration may have been updated. Therefore, the user-side device does not record the length Mds_ini of the downstream transmission duration during the previous initialization. Therefore, the network-side device needs to send the length of the downstream transmission duration during the previous initialization to the user-side device.

For example, the length of the downstream transmission duration used by the user-side device during the previous initialization is 10, and the length of the downstream transmission duration is updated to 20 during showtime. When the user-side device goes offline and performs Fast retrain, the network-side device may send the length and the second identifier of the downstream transmission duration during the previous initialization to the user-side device. The length of the downstream transmission duration during the previous initialization is 10, and the difference indicated by the second identifier is 10. In this case, the user-side device may determine, based on the length and the second identifier of the downstream transmission duration during the previous initialization, that a length of a new downstream transmission duration is 20.

In one implementation of this embodiment of the present invention, the second identifier may be defined using an offset. Offset=Mds_current−Mds_ini. To be specific, if Mds_current is greater than Mds_ini, the offset is a positive number. If Mds_current is less than Mds_ini, the offset is a negative number. Mds_current is the length of the currently used downstream transmission duration.

In another implementation of this embodiment of the present invention, the second identifier may alternatively be defined using another parameter, for example, m and n. Offset=m×4+n and Offset=Mds_current−Mds_ini. In this case, the network-side device needs to send only Mds_ini, m, and n. The offset may be replaced by m and n, to reduce a quantity of bits in the second identifier and reduce resources. For example, a length of the offset may be a 5-bit binary number. Only four bits may be required when m and n are used. It should be noted that 4 in the foregoing formula is merely an example, and may alternatively be replaced by a number greater than 4 or less than 4. Using a number greater than 4 can further reduce a quantity of bits in the second identifier.

Step S63: The user-side device receives the length and the second identifier of the downstream transmission duration during the previous initialization that are sent by the network-side device, and calculates the length of the currently used downstream transmission duration based on the length and the second identifier of the downstream transmission duration during the previous initialization.

Step S64: During initialization, the user-side device sets lengths of upstream and downstream transmission durations based on the length of the currently used downstream transmission duration.

After receiving the offset and Mds_ini, the user-side device calculates Mds_current=Mds_ini+offset, and sets a downstream receiving duration to Mds_current and an upstream sending duration to MF-Mds_current−1 during initialization. Such setting continues until Mds is updated during showtime. Therefore, Mds_current in this embodiment of the present invention may be Mds_Old described above.

After the setting, upstream and downstream transmission zones can be configured based on Mds_current for a line requiring fast retraining during initialization. This effectively avoids the near-end crosstalk caused by unequal Mds between the line requiring fast retraining and the line during showtime.

Figure 12:
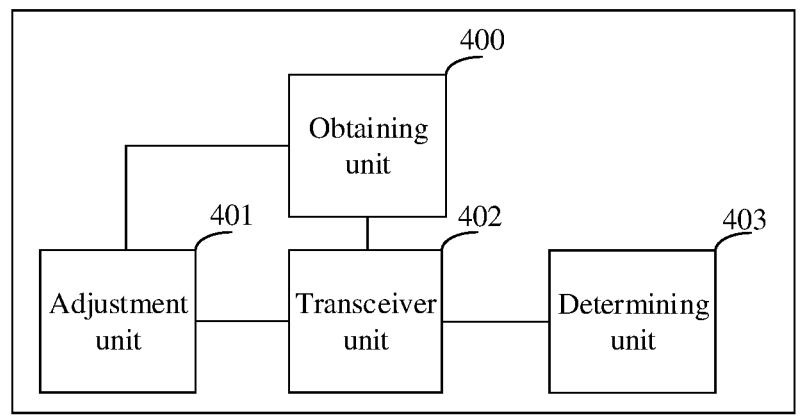
FIG. 12 is a schematic diagram of a structure of a dynamic time adjustment apparatus according to an embodiment of the present invention.

An embodiment of the present invention provides a dynamic time adjustment apparatus. The dynamic time adjustment apparatus may be the foregoing network-side device. Referring to FIG. 12, the dynamic time adjustment apparatus includes: an obtaining unit 400, an adjustment unit 401, and a transceiver unit 402.

The dynamic time adjustment apparatus may be implemented as all or a part of the network-side device by using a dedicated hardware circuit or a combination of software and hardware. The obtaining unit 400 is configured to a length Mds_New of a new downstream transmission duration. The adjustment unit 401 is configured to adjust a length of a downstream transmission duration of a first transceiver from a length Mds_Old of a currently used downstream transmission duration to Mds_New, and adjust a length of an upstream transmission duration of the first transceiver from a length Mus_Old of a currently used upstream transmission duration to a length Mus_New of a new upstream transmission duration. The first transceiver is any one of at least two transceivers of the network-side device. A sum of Mds_New and Mus_New is equal to a length of one transmission frame minus a length of an upstream and downstream switching duration. The upstream and downstream switching duration is a duration spent by the first transceiver to switch from a receiving state to a sending state and switch from the sending state to the receiving state. The transceiver unit 402 is configured to: when Mds_New is greater than Mds_Old, keep silent or send an idle symbol or another symbol with known content in a transition zone of the new downstream transmission duration of the first transceiver, where the transition zone of the new downstream transmission duration of the first transceiver is an additional zone of the new downstream transmission duration compared with the currently used downstream transmission duration; or when Mds_New is less than Mds_Old, receive a quiet symbol, an idle symbol, or another symbol with known content in a transition zone of the new upstream transmission duration of the first transceiver, where the transition zone of the new upstream transmission duration of the first transceiver is an additional zone of the new upstream transmission duration compared with the currently used upstream transmission duration.

Optionally, the transceiver unit 402 is further configured to send a first indication message and a second indication message.

Optionally, the dynamic time adjustment apparatus further includes a determining unit 403. The determining unit 403 is configured to determine whether lengths of downstream transmission durations of transceivers of at least two user-side devices are adjusted to Mds_New, and whether lengths of upstream transmission durations of the transceivers of the at least two user-side devices are adjusted to Mus_New.

For related details, refer to the method embodiments shown in FIG. 6 to FIG. 11.

It should be noted that, the adjustment unit 401 and the determining unit 403 may be implemented by a processor, or implemented by executing a program instruction in a memory by a processor. The obtaining unit 400 and the transceiver unit 402 may be implemented by a communications interface, or implemented by a communications interface in combination with a processor.

Figure 13:
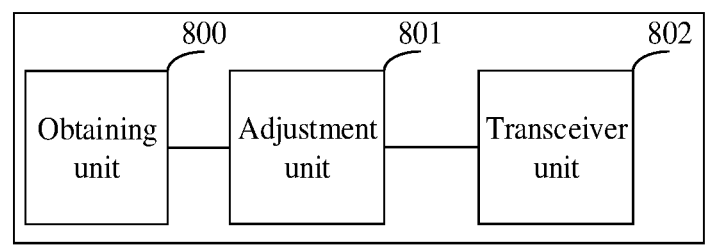
FIG. 13 is a schematic diagram of a structure of another dynamic time adjustment apparatus according to an embodiment of the present invention.

An embodiment of the present invention provides a dynamic time adjustment apparatus. The dynamic time adjustment apparatus may be the foregoing user-side device. Referring to FIG. 13, the dynamic time adjustment apparatus includes:

The dynamic time adjustment apparatus may be implemented as all or a part of the user-side device by using a dedicated hardware circuit or a combination of software and hardware. The dynamic time adjustment apparatus includes an obtaining unit 800, an adjustment unit 801, and a transceiver unit 802. The obtaining unit 800 is configured to obtain a length Mds_New of a new downstream transmission duration. The adjustment unit 801 is configured to adjust a length of a downstream transmission duration of a transceiver of the user-side device from a length Mds_Old of a currently used downstream transmission duration to Mds_New, and adjust a length of an upstream transmission duration of the transceiver of the user-side device from a length Mus_Old of a currently used upstream transmission duration to a length Mus_New of a new upstream transmission duration. A sum of Mds_New and Mus_New is equal to a length of one transmission frame minus a length of an upstream and downstream switching duration. The upstream and downstream switching duration is a duration spent by the transceiver of the user-side device to switch from a receiving state to a sending state and switch from the sending state to the receiving state. The transceiver unit 802 is configured to: when Mds_New is greater than Mds_Old, receive a quiet symbol, an idle symbol, or another symbol with known content in a transition zone of the new downstream transmission duration of the transceiver of the user-side device, where the transition zone of the new downstream transmission duration of the transceiver of the user-side device is an additional zone of the new downstream transmission duration compared with the currently used downstream transmission duration; or when Mds_New is less than Mds_Old, keep silent or send an idle symbol or another symbol with known content in a transition zone of the new upstream transmission duration of the transceiver of the user-side device, where the transition zone of the new upstream transmission duration of the transceiver of the user-side device is an additional zone of the new upstream transmission duration compared with the currently used upstream transmission duration.

Optionally, the transceiver unit 802 is further configured to send a first indication message and a second indication message.

For related details, refer to the method embodiments shown in FIG. 6 to FIG. 11.

It should be noted that, the adjustment unit 801 may be implemented by a processor, or implemented by executing a program instruction in a memory by a processor. The obtaining unit 800 and the transceiver unit 802 may be implemented by a communications interface, or implemented by a communications interface in combination with a processor.

Figure 14:
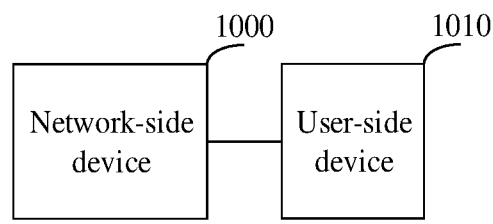
FIG. 14 is a schematic diagram of a structure of a dynamic time adjustment system according to an embodiment of the present invention.

An embodiment of the present invention provides a dynamic time adjustment system. Referring to FIG. 14, the dynamic time adjustment system may include the foregoing network-side device 1000 and the user-side device 1010. The network-side device 1000 includes the dynamic time adjustment apparatus shown in FIG. 12, and the user-side device 1010 includes the dynamic time adjustment apparatus shown in FIG. 13.

It should be noted that dynamic time adjustment of the dynamic time adjustment apparatus according to the foregoing embodiments is described merely by using division of the foregoing functional modules as an example. In an actual application, the foregoing functions can be allocated to different functional modules according to requirements. To be specific, an internal structure of a device is divided into different functional modules to implement all or some of the functions described above. In addition, the dynamic time adjustment apparatus and method provided in the foregoing embodiments belong to a same concept. For a specific implementation process of the dynamic time adjustment apparatus, refer to the method embodiment. Details are not described herein again.

Persons of ordinary skill in the art may understand that all or some of the steps of the embodiments may be implemented by hardware or a program instructing related hardware. The program may be stored in a computer readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method, comprising:
obtaining, by a network-side device, a length Mds_New of a new downstream transmission duration, wherein the network-side device comprises at least two transceivers;
adjusting, by the network-side device, a length of a downstream transmission duration of a first transceiver of the at least two transceivers from a length Mds_Old of a currently used downstream transmission duration to Mds_New,
adjusting a length of an upstream transmission duration of the first transceiver from a length Mus_Old of a currently used upstream transmission duration to a length Mus_New of a new upstream transmission duration, wherein a sum of Mds_New and Mus_New is equal to a length of one transmission frame minus a sum of a length of an upstream switching duration and a length of a downstream switching duration, the upstream transmission duration is a duration taken by the first transceiver to switch from a receiving state to a sending state, and the downstream transmission duration is a duration taken by the first transceiver to switch from the sending state to the receiving state;
in response to Mds_New being greater than Mds_Old, keeping silent, by the network-side device, in a transition zone of the new downstream transmission duration of the first transceiver, or sending, by the network-side device, an idle symbol or another symbol with known content in the transition zone of the new downstream transmission duration of the first transceiver, wherein the transition zone of the new downstream transmission duration of the first transceiver is an additional zone of the new downstream transmission duration compared to the currently used downstream transmission duration; and
in response to Mds_New being less than Mds_Old, receiving, by the network-side device, a quiet symbol, an idle symbol, or another symbol with known content in a transition zone of the new upstream transmission duration of the first transceiver, wherein the transition zone of the new upstream transmission duration of the first transceiver is an additional zone of the new upstream transmission duration compared with the currently used upstream transmission duration.

2. The method according to claim 1, further comprising: after obtaining Mds_New, sending, by the network-side device, a first indication message to a user-side device, wherein the first indication message:
indicates Mds_New; and
instructs to send, when Mds_New is less than Mds_Old, before the user-side device receives a second indication message, and when a current transmission frame is a synchronization frame, a synchronization symbol in a first symbol in or after the transition zone of the new upstream transmission duration, wherein the second indication message instructs the user-side device to send a data transmission phase symbol in the transition zone of the new upstream transmission duration.

3. The method according to claim 2, further comprising: in response to Mds_New being less than Mds_Old, lengths of downstream transmission durations of transceivers of at least two user-side devices being adjusted to Mds_New, and lengths of upstream transmission durations of the transceivers of the at least two user-side devices being adjusted to Mus_New, sending, by the network-side device, the second indication message to the at least two user-side devices, wherein the transceivers of the at least two user-side devices are in a one to one correspondence with the at least two transceivers of the network-side device.

4. The method according to claim 2, wherein the second indication message further instructs the user-side device to adjust a position of an upstream robust management channel (RMC) symbol corresponding to a transceiver of the user-side device.

5. The method according to claim 1, further comprising: in response to Mds_New being greater than Mds_Old, lengths of downstream transmission durations of transceivers of at least two user-side devices being adjusted to Mds_New, and lengths of upstream transmission durations of the transceivers of the at least two user-side devices being adjusted to Mus_New, sending, by the network-side device, a data transmission phase symbol in the transition zone of the new downstream transmission duration, wherein the transceivers of the at least two user-side devices are in a one-to-one correspondence with the at least two transceivers of the network-side device.

6. The method according to claim 1, further comprising: in response to receiving an online request sent by a user-side device, sending, by the network-side device, a default length of the downstream transmission duration and a first identifier of the downstream transmission duration to the user-side device during handshake, wherein the first identifier indicates a value of a difference between Mds_Old and the default length of the downstream transmission duration.

7. The method according to claim 1, further comprising: in response to receiving a fast retraining request sent by a user-side device, sending, by the network-side device to the user-side device, a length and a second identifier of the downstream transmission duration during a previous initialization of the user-side device, wherein the second identifier indicates a value of a difference between Mds_Old and the length of the downstream transmission duration during the previous initialization of the user-side device.

8. A method, comprising:
obtaining, by a user-side device, a length Mds_New of a new downstream transmission duration;
adjusting, by the user-side device, a length of a downstream transmission duration of a transceiver of the user-side device from a length Mds_Old of a currently used downstream transmission duration to Mds_New, and adjusting, by the user-side device, a length of an upstream transmission duration of the transceiver of the user-side device from a length Mus_Old of a currently used upstream transmission duration to a length Mus_New of a new upstream transmission duration, wherein a sum of Mds_New and Mus_New is equal to a length of one transmission frame minus a sum of a length of an upstream switching duration and a length of a downstream switching duration, the upstream switching duration is a duration taken by the transceiver of the user-side device to switch from a receiving state to a sending state, and the downstream switching duration is a duration taken by the transceiver of the user-side device to switch from the sending state to the receiving state;
in response to Mds_New being greater than Mds_Old, receiving, by the user-side device, a quiet symbol, an idle symbol, or another symbol with known content in a transition zone of the new downstream transmission duration of the transceiver of the user-side device, wherein the transition zone of the new downstream transmission duration of the transceiver of the user-side device is an additional zone of the new downstream transmission duration compared with the currently used downstream transmission duration; and
in response to Mds_New being less than Mds_Old, keeping silent, by the user-side device, in a transition zone of the new upstream transmission duration of the transceiver of the user-side device, or sending, by the user-side device, an idle symbol or another symbol with known content in the transition zone of the new upstream transmission duration of the transceiver of the user-side device, wherein the transition zone of the new upstream transmission duration of the transceiver of the user-side device is an additional zone of the new upstream transmission duration compared with the currently used upstream transmission duration.

9. The method according to claim 8, wherein:
obtaining, by the user-side device, the length of the new downstream transmission duration comprises:
receiving, by the user-side device, a first indication message sent by a network-side device, wherein the first indication message indicates Mds_New; and
the method further comprises:
before the user-side device receives a second indication message, and when a current transmission frame is a synchronization frame, determining, by the user-side device according to the first indication message, a position for sending a synchronization symbol, wherein the first indication message instructs to:
in response to Mds_New being less than Mds_Old, before the user-side device receives the second indication message, and when the current transmission frame is a synchronization frame, send the synchronization symbol in or after a first symbol in the transition zone of the new upstream transmission duration; and the second indication message instructs the user-side device to send a data transmission phase symbol in the transition zone of the new upstream transmission duration.

10. The method according to claim 9, further comprising: when Mds_New is less than Mds_Old, receiving, by the user-side device, the second indication message sent by the network-side device.

11. The method according to claim 8, further comprising: receiving, by the user-side device, a default length and a first identifier of the downstream transmission duration that are sent by a network-side device, and calculating, by the user-side device, Mds_Old based on the default length and the first identifier of the downstream transmission duration, wherein the first identifier indicates a value of a difference between Mds_Old and the default length of the downstream transmission duration; and setting, by the user-side device, the length of the downstream transmission duration and the length of the upstream transmission duration based on Mds_Old during initialization.

12. An apparatus, comprising:
a processor;
a communications interface comprising at least two transceivers; and
a non-transitory computer readable storage medium storing a plurality of processor-executable instructions, the instructions including instructions for causing the processor and the communications interface to perform operations comprising:
 obtaining a length Mds_New of a new downstream transmission duration;
 adjusting a length of a downstream transmission duration of a first transceiver of the at least two transceivers from a length Mds_Old of a currently used downstream transmission duration to Mds_New, and adjusting a length of an upstream transmission duration of the first transceiver from a length Mus_Old of a currently used upstream transmission duration to a length Mus_New of a new upstream transmission duration, wherein a sum of Mds_New and Mus_New is equal to a length of one transmission frame minus a sum of a length of an upstream switching duration and a length of a downstream switching duration, the upstream switching duration is a duration taken by the first transceiver to switch from a receiving state to a sending state, and the downstream switching duration is a duration taken by the first transceiver to switch from the sending state to the receiving state;
 in response to Mds_New being greater than Mds_Old, keeping silent in a transition zone of the new downstream transmission duration of the first transceiver, or sending an idle symbol or another symbol with known content in the transition zone of the new downstream transmission duration of the first transceiver, wherein the transition zone of the new downstream transmission duration of the first transceiver is an additional zone of the new downstream transmission duration compared with the currently used downstream transmission duration; and
 in response to Mds_New being less than Mds_Old, receiving a quiet symbol, an idle symbol, or another symbol with known content in a transition zone of the new upstream transmission duration of the first transceiver, wherein the transition zone of the new upstream transmission duration of the first transceiver is an additional zone of the new upstream transmission duration compared with the currently used upstream transmission duration.

13. The apparatus according to claim 12, wherein the instructions further include instructions for causing the processor and the communications interface to perform operations comprising:
 after obtaining Mds_New, sending a first indication message to a user-side device, wherein the first indication message indicates Mds_New, and the first indication message instructs to:
  when Mds_New is less than Mds_Old, before the user-side device receives a second indication message, and when a current transmission frame is a synchronization frame, send a synchronization symbol in a first symbol in or after the transition zone of the new upstream transmission duration, wherein the second indication message instructs the user-side device to send a data transmission phase symbol in the transition zone of the new upstream transmission duration.

14. The apparatus according to claim 13, wherein the instructions further include instructions for causing the processor and the communications interface to perform operations comprising:
 in response to Mds_New being less than Mds_Old, lengths of downstream transmission durations of transceivers of at least two user-side devices being adjusted to Mds_New, and lengths of upstream transmission durations of the transceivers of the at least two user-side devices being adjusted to Mus_New, sending the second indication message to the user-side devices, wherein the transceivers of the at least two user-side devices are in a one to one correspondence with the at least two transceivers of the apparatus.

15. The apparatus according to claim 12, wherein the instructions further include instructions for causing the processor and the communications interface to perform operations comprising:
 in response to Mds_New being greater than Mds_Old, lengths of downstream transmission durations of transceivers of at least two user-side devices being adjusted to Mds_New, and lengths of upstream transmission durations of the transceivers of the at least two user-side devices being adjusted to Mus_New, sending a data transmission phase symbol in the transition zone of the new downstream transmission duration, wherein the transceivers of the at least two user-side devices have a one to one correspondence with the at least two transceivers of the apparatus.

16. The apparatus according to claim 12, wherein the instructions further include instructions for causing the processor and the communications interface to perform operations comprising:
 in response to receiving an online request, sending a default length of the downstream transmission duration and a first identifier of the downstream transmission duration to a user-side device during handshake, wherein the first identifier is configured to indicate a value of a difference between Mds_Old and the default length of the downstream transmission duration.

17. The apparatus according to claim 12, wherein the instructions further include instructions for causing the processor and the communications interface to perform operations comprising:
 in response to receiving a fast retraining request sent by a user-side device, sending a length of the downstream transmission duration and a second identifier of the downstream transmission duration during a previous initialization of the user-side device to the user-side device, wherein the second identifier indicates a value of a difference between Mds_Old and the length of the downstream transmission duration during the previous initialization of the user-side device.

18. An apparatus, comprising:
a processor;
a communications interface comprising a transceiver; and
a non-transitory computer readable storage medium storing a plurality of processor-executable instructions, the instructions including instructions for causing the processor and the communications interface to perform operations comprising:
  obtaining a length Mds_New of a new downstream transmission duration;
  adjusting a length of a downstream transmission duration of the transceiver from a length Mds_Old of a currently used downstream transmission duration to Mds_New, and adjusting a length of an upstream transmission duration of the transceiver from a length Mus_Old of a currently used upstream transmission duration to a length Mus_New of a new upstream transmission duration, wherein a sum of Mds_New and Mus_New is equal to a length of one transmission frame minus a sum of a length of an upstream switching duration and a length of a downstream switching duration, the upstream switching duration is a duration taken by the transceiver to switch from a receiving state to a sending state, and the downstream switching duration is a duration taken by the transceiver to switch from the sending state to the receiving state; and
  in response to Mds_New being greater than Mds_Old, receiving a quiet symbol, an idle symbol, or another symbol with known content in a transition zone of the new downstream transmission duration of the transceiver, wherein the transition zone of the new downstream transmission duration of the transceiver is an additional zone of the new downstream transmission duration compared with the currently used downstream transmission duration; or
  in response to Mds_New being less than Mds_Old, keeping silent in a transition zone of the new upstream transmission duration of the transceiver, or sending an idle symbol or another symbol with known content in the transition zone of the new upstream transmission duration of the transceiver, wherein the transition zone of the new upstream transmission duration of the transceiver is an additional zone of the new upstream transmission duration compared with the currently used upstream transmission duration.

19. The apparatus according to claim 18, wherein the instructions further include instructions for causing the processor and the communications interface to perform operations comprising:
  receiving a first indication message sent by a network-side device, wherein the first indication message indicates the length of the new downstream transmission duration;
  obtaining the length of the new downstream transmission duration according to the first indication message; and
  before receiving a second indication message, and when a current transmission frame is a synchronization frame, determining, according to the first indication message, a position for sending a synchronization symbol, wherein the first indication message instructs to:
  when Mds_New is less than Mds_Old, before receiving the second indication message, and when the current transmission frame is a synchronization frame, send the synchronization symbol in or after a first symbol in the transition zone of the new upstream transmission duration; and
  wherein the second indication message instructs to send a data transmission phase symbol in the transition zone of the new upstream transmission duration.

20. The apparatus according to claim 18, wherein the instructions further include instructions for causing the processor and the communications interface to perform operations comprising:
  receiving a default length of the downstream transmission duration and a first identifier of the downstream transmission duration that are sent by a network-side device, wherein the first identifier indicates a value of a difference between Mds_Old and the default length of the downstream transmission duration; and
  calculating Mds_Old based on the default length of the downstream transmission duration and the first identifier of the downstream transmission duration, and setting a length of the downstream transmission duration and a length of the upstream transmission duration based on Mds_Old during initialization.

* * * * *